(12) United States Patent
Yamashita

(10) Patent No.: US 7,916,896 B2
(45) Date of Patent: Mar. 29, 2011

(54) STORAGE MEDIUM HAVING INFORMATION PROCESSING PROGRAM STORED THEREON AND INFORMATION PROCESSING APPARATUS

(75) Inventor: Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 973 days.

(21) Appl. No.: 11/802,982

(22) Filed: May 29, 2007

(65) Prior Publication Data

US 2008/0232644 A1 Sep. 25, 2008

(30) Foreign Application Priority Data

Mar. 22, 2007 (JP) ................................. 2007-075523

(51) Int. Cl.
*G06K 9/00* (2006.01)
(52) U.S. Cl. ........................................ 382/103; 382/107
(58) Field of Classification Search .................. 382/100, 382/103, 107, 317; 463/36, 37, 39; 345/158
See application file for complete search history.

(56) References Cited

U.S. PATENT DOCUMENTS

2008/0013793 A1* 1/2008 Hillis et al. .................... 382/114
2008/0100825 A1* 5/2008 Zalewski ......................... 356/29

FOREIGN PATENT DOCUMENTS

JP 2005-253724 9/2005

* cited by examiner

*Primary Examiner* — Andrew W Johns
(74) *Attorney, Agent, or Firm* — Nixon & Vanderhye P.C.

(57) ABSTRACT

A motion information obtaining step successively obtains motion information from a motion sensor. An imaging information obtaining step successively obtains imaging information from an imaging means. An invalid information determination step determines whether the imaging information is valid information or invalid information for predetermined processing. A motion value calculation step calculates a motion value representing a magnitude of a motion of the operation apparatus in accordance with the motion information. A processing step executes, when the imaging information is determined as the invalid information in the invalid information determination step and when the motion value calculated in the motion calculation step is within a predetermined value range, predetermined processing in accordance with most recent valid imaging information among valid imaging information previously obtained.

23 Claims, 18 Drawing Sheets

Fig. 8
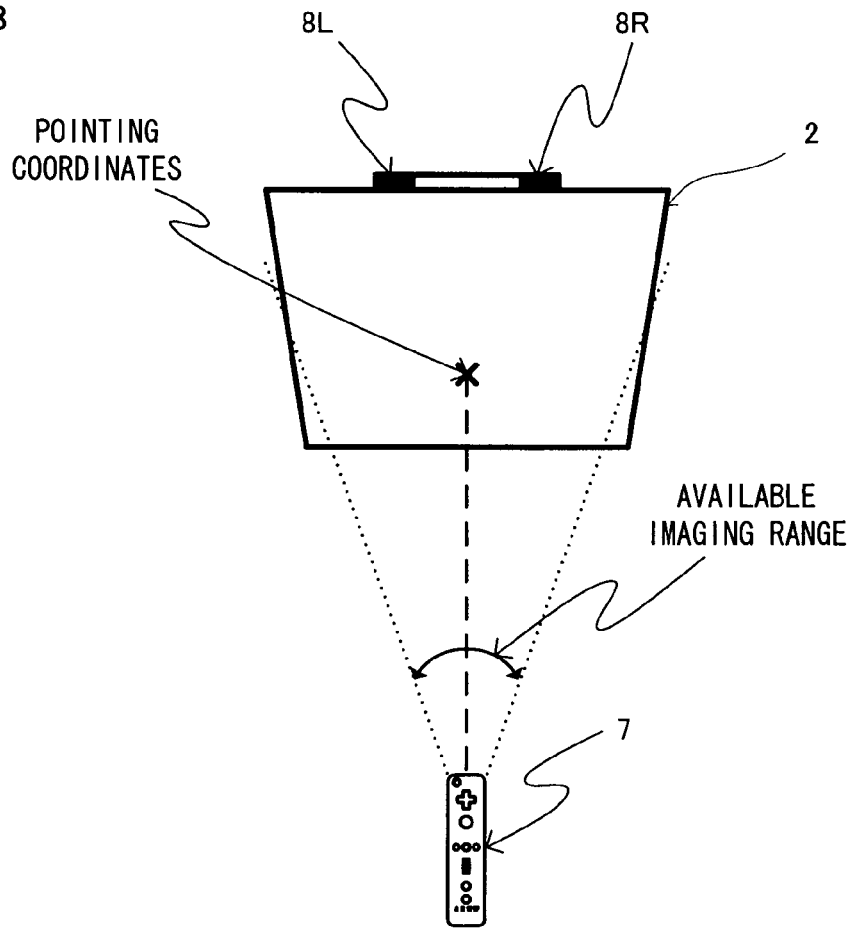
Fig. 9
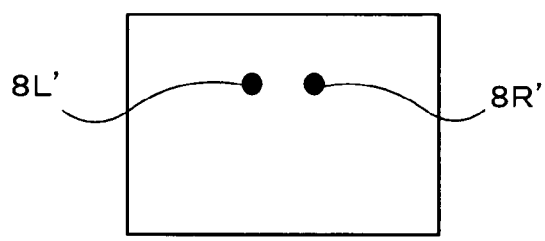
Fig. 10
| MARKER 8L | MARKER 8R |
|---|---|
| (300, 180) | (340, 180) |

Fig. 11
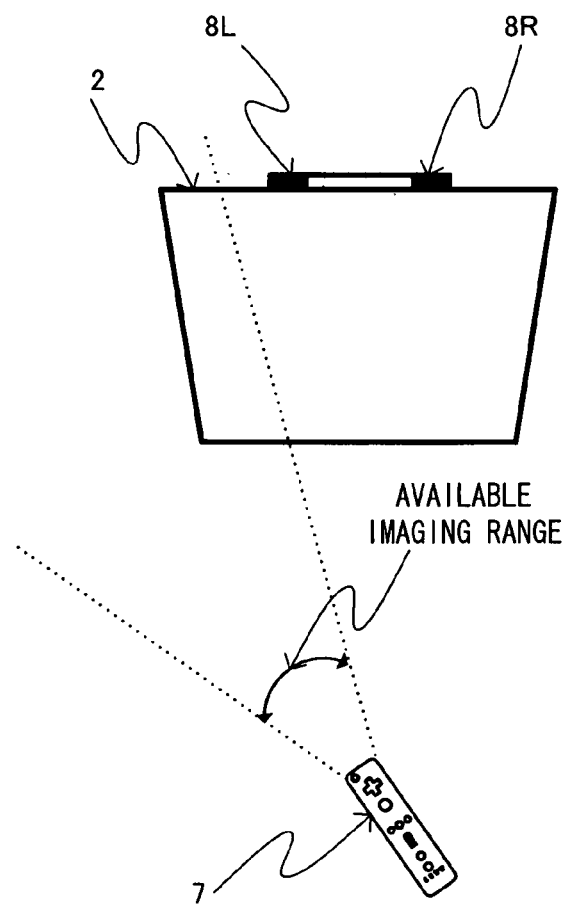
AVAILABLE IMAGING RANGE
Fig. 12
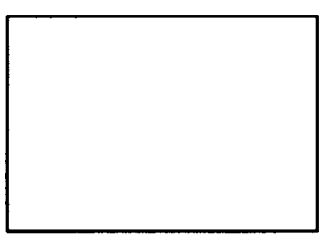
Fig. 13
| TARGET IMAGE 1 | TARGET IMAGE 2 |
|---|---|
| NULL | NULL |
Fig. 14
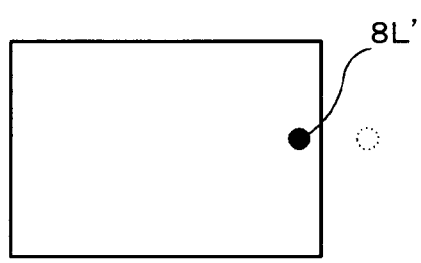
Fig. 15
| TARGET IMAGE 1 | TARGET IMAGE 2 |
|---|---|
| (630, 310) | NULL |

STORAGE MEDIUM HAVING INFORMATION PROCESSING PROGRAM STORED THEREON AND INFORMATION PROCESSING APPARATUS

CROSS REFERENCE TO RELATED APPLICATION

The disclosure of Japanese Patent Application No. 2007-75523, filed Mar. 22, 2007, is incorporated herein by reference.

BACKGROUND OF THE INVENTION

1. Field of the Invention

The present invention relates to a storage medium having an information processing program stored thereon and an information processing apparatus, and more particularly to a storage medium having stored thereon an information processing program executed by a computer of an information processing apparatus which executes predetermined processing corresponding to an orientation of the operation apparatus with respect to the imaging target in accordance with imaging information obtained, from the operation apparatus including a motion sensor outputting motion information corresponding to a motion applied thereto and an imaging means for picking up a target image to be picked up, by using the imaging means, and the information processing apparatus.

2. Description of the Background Art

A gun shooting game apparatus for playing gunfighting with a target displayed on a screen has been well known (e.g. Japanese Laid-Open Patent Publication No. 2005-253724). In the gun shooting game, a gun unit, which corresponds to a controller imitating a gun, is used as an input apparatus. A CCD camera is embedded in an inside of a barrel of the gun unit such that an image from a gun muzzle can be picked up. Further, on the screen, six light-emitting diodes (LEDs), which emit infrared radiation, are arranged. The gun muzzle is directed to the screen such that the CCD camera embedded in the gun unit picks up an image on the screen, and positions of the LEDs are identified by analyzing the picked up image data. Based on the identified positions of the LEDs, an impact point is calculated. Further, in the case where the positions of the LEDs cannot be identified, as a result of the analysis of the above-described picked up image data, it is determined that the gun muzzle of the gun unit does not point the direction of the screen. Further, in the case where the screen is situated near a window and sunlight is pouring through the window, the CCD camera may pick up the sunlight as light of the LEDs, and consequently the sunlight is picked up as an image. Further, in the case where a glossy material is placed near the LEDs, it may possible that the sunlight or the infrared radiation emitted from the LEDs is reflected on the glossy material, collected by the CCD camera, and then picked up as an image. As a result, a great amount of light is recoded on the picked up image data, which has been a problem in that the positions of the LEDs cannot be identified.

The game apparatus as described in the above-described Japanese Laid-Open Patent Publication No. 2005-253724 has a problem as below indicated. In the above-described game apparatus, in the case where the positions of the LEDs cannot be identified as a result of the analysis of the picked up image data, it is determined that the gun muzzle of the gun unit does not point the direction of the screen. However, even in the case where the gun muzzle of the gun unit points the direction of the screen, the positions of the LEDs cannot be identified at the time when, for example, a person passes in front of the screen. As a result, even if the gun muzzle of the gun unit points the direction of the screen, processing has been performed based on the determination that the gun muzzle is not directed to the screen. That is, when an obstruction appears between the screen and the gun muzzle of the gun unit, for example, when the person passes in front of the screen, the LEDs are obstructed temporarily and not picked up by the CCD camera embedded in the gun unit, which consequently causes a problem in that it is determined that the gun muzzle of the gun unit is directed to a direction outside of the screen.

SUMMARY OF THE INVENTION

Therefore, an object of the present invention is to provide storage medium having stored thereon an information processing program and an information processing apparatus capable of performing appropriate processing even when an obstruction appears temporarily between an operation apparatus including an imaging means and a screen.

The present invention has the following features to solve the above problem. Please note that the reference numerals, additional explanations and the like in parentheses in this section of the specification indicate the correspondence with the embodiment described later for the sake of easy understanding of the present invention, and do not limit the present invention in any way.

A first aspect is a storage medium having stored thereon an information processing program executable by a computer of a information processing apparatus which, by using an operation apparatus including an imaging means for picking up a target image to be picked up so as to obtain imaging information, and in accordance with the imaging information, executes predetermined processing corresponding to an orientation of the operation apparatus with respect to a location of the target image to be picked up, the information processing program causing the computer to execute a motion information obtaining step (S2), an imaging information obtaining step (S3), an invalid information determination step (S4), a motion value calculation step (S33, S34, S35), and a processing step (S36, S37). The motion information obtaining step successively obtains motion information from a motion sensor outputting the motion information corresponding to a motion of the operation apparatus. The imaging information obtaining step successively obtains the imaging information from the imaging means. The invalid information determination step determines whether the imaging information is valid information or invalid information for the predetermined processing. The motion value calculation step calculates a motion value representing a magnitude of the motion of the operation apparatus in accordance with the motion information. The processing step executes, when the imaging information is determined as invalid information in the invalid information determination step and when the motion value calculated in the motion value calculation step is within a predetermined value range, the predetermined processing in accordance with most recent imaging information among valid imaging information obtained before the imaging information determined as the invalid information is obtained.

In a second aspect based on the first aspect, the motion value calculation step is executed only when the imaging information is the invalid information.

In a third aspect based on the first aspect, the invalid information determination step includes an invalid condition determination step of determining whether or not the imaging information satisfies a predetermined condition. Further, in the invalid condition determination step, in the case where the imaging information is determined to be unsatisfactory to the predetermined condition, the imaging information is determined as the invalid information.

In a fourth aspect based on the first aspect, the predetermined processing is a process of calculating a pointing position on a screen of a given display apparatus. Further the invalid information determination step determines, in the case where the pointing position of the imaging information cannot be calculated, the imaging information as the invalid information. Still further, the processing step calculates, when the imaging information is determined as the invalid information in the invalid information determination step, and when the motion value calculated in the motion value calculation step is within the predetermined value range, the pointing position in accordance with the most recent imaging information among the valid imaging information.

In a fifth aspect based on the first aspect, the predetermined processing represents processing of calculating, based on the imaging information, and using variation in the orientation of the operation apparatus. Further, the invalid information determination step determines, in the case where the variation cannot be calculated based on the imaging information, the imaging information as the invalid information. Still further, the processing step performs, when the imaging information is determined as the invalid information in the invalid information determination step and when the motion value calculated in the motion value calculation step is within the predetermined value range, processing by using the variation calculated most recently.

In a sixth aspect according to the first aspect, the invalid information for the predetermined processing represents imaging information including a NULL code. The invalid information determination step determines whether the imaging information is the valid information or the invalid information in accordance with whether or not the imaging information includes the NULL code.

In a seventh aspect based on the first aspect, the information processing program further causes the computer, after the imaging information is determined as the invalid information, to execute a timer step (S32, S40) of measuring a duration time during which the imaging information successively obtained is continuously being determined as the invalid information. The processing step executes predetermined processing for the case of the invalid information regardless of a determination result in the invalid information determination step, when the duration time measured in the timer step is equal to or larger than a predetermined value.

In an eighth aspect based on the first aspect, the motion sensor is an acceleration sensor detecting acceleration exerted on the operation apparatus. The motion information includes acceleration data outputted from the acceleration sensor in accordance with the motion of the operation apparatus.

In a ninth aspect based on the eighth aspect, the motion value calculation step includes a first acceleration vector calculation step (S34), a second acceleration vector calculation step (S34), and an angular difference calculation step (S34). The first acceleration vector calculation step calculates a first acceleration vector in accordance with the acceleration data. The second acceleration vector calculation step calculates a second acceleration vector in accordance with acceleration data obtained immediately prior to the acceleration data. The angular difference calculation step calculates an angular difference between the first acceleration vector and the second acceleration vector. Further, the processing step executes the predetermined processing in accordance with the most recent information among the valid imaging information obtained before the imaging information determined as the invalid information is obtained, when the angular difference calculated in the angular difference calculation step is within a predetermined range.

In a tenth aspect based on the eighth aspect, the motion value calculation step includes a first acceleration vector calculation step, a second acceleration vector calculation step, and a scalar product calculation step. The first acceleration vector calculation step calculates a first acceleration vector in accordance with the acceleration data. The second acceleration vector calculation step calculates a second acceleration vector in accordance with acceleration data obtained immediately prior to the acceleration data. The scalar product calculation step calculates a scalar product of the first acceleration vector and the second acceleration vector. Further, the processing step executes the predetermined processing in accordance with the most recent information among the valid imaging information obtained before the imaging information determined as the invalid data is obtained, when the scalar product calculated in the scalar product calculation step is within a predetermined range.

In an eleventh aspect based on the eighth aspect, the acceleration sensor detects acceleration along at least two coordinate axes perpendicular to one another. The information processing program further causes the computer to execute an acceleration difference calculation step (S41) of calculating, when the imaging information is determined as the invalid information in the invalid information determination step, a difference in the acceleration along each of said at least two coordinate axes between acceleration data which is detected at the time when the invalid information is obtained and most recent acceleration data among acceleration detected before the invalid information is obtained. Further, the processing step executes, only when the difference in the acceleration along at each of said at least two coordinate axes calculated in the acceleration difference calculation step is equal to or lower than a predetermined value, the predetermined processing in accordance with the most recent information among the valid imaging information obtained before the imaging information determined as the invalid information is obtained.

A twelfth aspect is an information processing apparatus (3) for executing, by using an operation apparatus (7) including an imaging means (74) for picking up a target image to be picked up so as to obtain imaging information, and in accordance with the imaging information, predetermined processing corresponding to an orientation of the operation apparatus with respect to a location of the target image to be picked up, the information processing apparatus comprising a motion sensor (701) for outputting motion information corresponding to a motion of the operation apparatus, a storage means (12), a motion information obtaining means (19, 10), an imaging information obtaining means (19, 10), an invalid information determination means (10), a motion value calculation means (10), and a processing means (10). The motion information obtaining means successively obtains the motion information, from the motion sensor, so as to be stored on the storage means. The imaging information obtaining means successively obtains the imaging information, from the imaging means, so as to be stored on the storage means. The invalid information determination means reads the imaging information from the storage means and determines whether the imaging information is valid information or invalid information for the predetermined processing. The motion value calculation means reads the motion information from the storage means and calculates a motion value representing a magnitude of the motion of the operation apparatus in accordance with the motion information. The processing means reads, when the imaging information is determined as the invalid information and when the motion value calculated by the motion value calculation means is within a predetermined value range, most recent imaging information, among valid imaging information obtained before the imaging information determined as the invalid information is obtained, so as to be used for executing the predetermined processing.

According to the above-described first aspect, in the case where the imaging information is the invalid information which disables the predetermined processing, it is possible to determine, based on the motion of the operation apparatus, whether or not the imaging information is intentionally nullified. In the case where the imaging information is not intentionally nullified, the predetermined processing can be performed by using the valid imaging information obtained most recently.

According to the above-described second or third aspect, the same effect as the first aspect can be obtained.

According to the above-described fourth aspect, at the time of pointing a screen or the like in accordance with the imaging information, it is possible to distinguish an intentional loss of the pointing information, such as a case where an outside of the screen is pointed, over an unintentional loss of the pointing information such as a temporary obstruction. Further, in the case of the unintentional loss of the pointing information, it is possible to execute/continue the predetermined processing by using the pointing information used most recently.

According to the above-described fifth aspect, in the case where processing corresponding to the variation in the orientation of the operation apparatus based on the imaging information is to be performed, and even in the case where the variation cannot be calculated, it is possible to perform the predetermined processing by using variation used before the invalid imaging information is generated as long as the invalid information is not intended by a player.

According to the above-described sixth aspect, it is possible to simplify and generalize the processing by determining, with the use of the NULL code, whether or not information is invalid.

According to the above-described seventh aspect, it is possible to determine, when the operation apparatus does not point the outside of the screen, whether or not an intentional act such as intentional covering of the imaging means of the operation apparatus by the player's hands is performed.

According to the above-described eighth aspect, it is possible to detect the motion of the operation apparatus by utilizing the acceleration.

According to the above-described ninth aspect, the magnitude of the motion of the operation apparatus can be determined accurately by comparing the angular difference between the acceleration vector at the time when the invalid imaging information is generated and the acceleration vector detected immediately prior thereto.

According to the above-described tenth aspect, the magnitude of the motion of the operation apparatus is determined in accordance with the scalar product between the acceleration vector at the time when the invalid imaging information is generated and the acceleration vector detected immediately prior thereto. Accordingly, it is possible to determine the magnitude of the motion of the operation apparatus accurately.

According to the above-described eleventh aspect, it is possible to simplify a processing content, thereby improving a processing speed.

According to the above-described twelfth aspect, it is possible to obtain the same effect as the above-described first aspect.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram illustrating a positional relation between the controller 7 and a television 2 (markers 8L and 8R);

FIG. 9 is a diagram illustrating an exemplary picked up image;

FIG. 10 is a diagram illustrating exemplary imaging information;

FIG. 11 is a diagram a positional relation between the controller 7 and a television 2 (markers 8L and 8R);

FIG. 12 is a diagram illustrating an exemplary picked up image;

FIG. 13 is a diagram illustrating exemplary imaging information;

FIG. 14 is a diagram illustrating an exemplary picked up image;

FIG. 15 is a diagram illustrating exemplary imaging information;

DESCRIPTION OF THE PREFERRED EMBODIMENTS (Overall Configuration of Game System)

Figure 1:
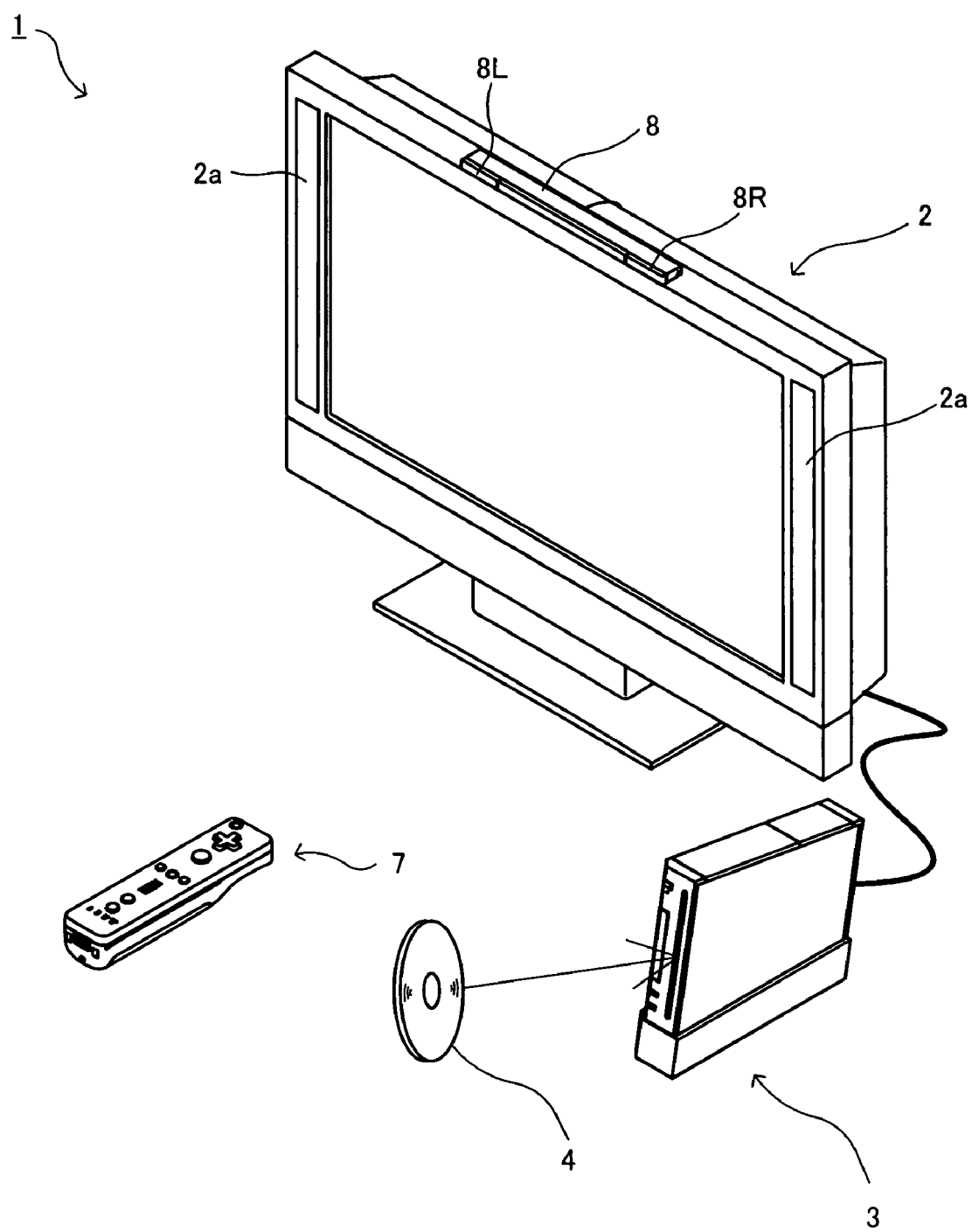
FIG. 1 is an external view illustrating a game system 1 according to the present invention.

With reference to FIG. 1, a game system 1 including a game apparatus according to an embodiment of the present invention will be described. FIG. 1 is an external view illustrating the game system 1. Hereinafter, the game apparatus and a game program of the present invention will be described by using a stationary game apparatus as an example. In FIG. 1, the game system 1 includes a television receiver (hereinafter simply referred to as "television") 2, a game apparatus 3, an optical disc 4, a controller 7, and a marker section 8. The present system causes the game apparatus 3 to execute game processing in accordance with a game operation using the controller 7.

To the game apparatus 3, the optical disc 4, which is an exemplary information storage medium exchangeably used for the game apparatus 3, is detachably inserted. On the optical disc 4, a game program to be executed by the game apparatus 3 is stored. An insertion slot for the optical disc 4 is provided at the front face of the game apparatus 3. The game apparatus 3 executes game processing by reading and executing the game program stored on the optical disc 4 inserted through the insertion slot.

To the game apparatus 3, the television 2, which is an exemplary display apparatus, is connected via a connection cord. The television 2 displays a game image obtained as a result of the game processing executed by the game apparatus 3. Further, on the periphery of a screen of the television 2 (an upper side of the screen in FIG. 1), the marker section 8 is provided. The marker section 8 has two markers 8R and 8L located at both ends thereof. The marker 8R (as well as the marker 8L) is specifically composed of one or more infrared LEDs, and outputs infrared light forward from the television 2. The marker section 8 is connected to the game apparatus 3, and the game apparatus 3 is capable of controlling lighting of respective red infrared LEDs contained in the marker section 8.

The controller 7 is an input device for providing the game apparatus 3 with operation data representing a content of an operation applied to the controller 7. The controller 7 and the game apparatus 3 are connected to each other by wireless communication. In the present embodiment, a technique of Bluetooth®, for example, is used for the wireless communication between the controller 7 and the game apparatus 3. In another embodiment, the controller 7 and the game apparatus 3 may be connected to each other via a fixed line.

(Internal Configuration of Game Apparatus)

Figure 2:
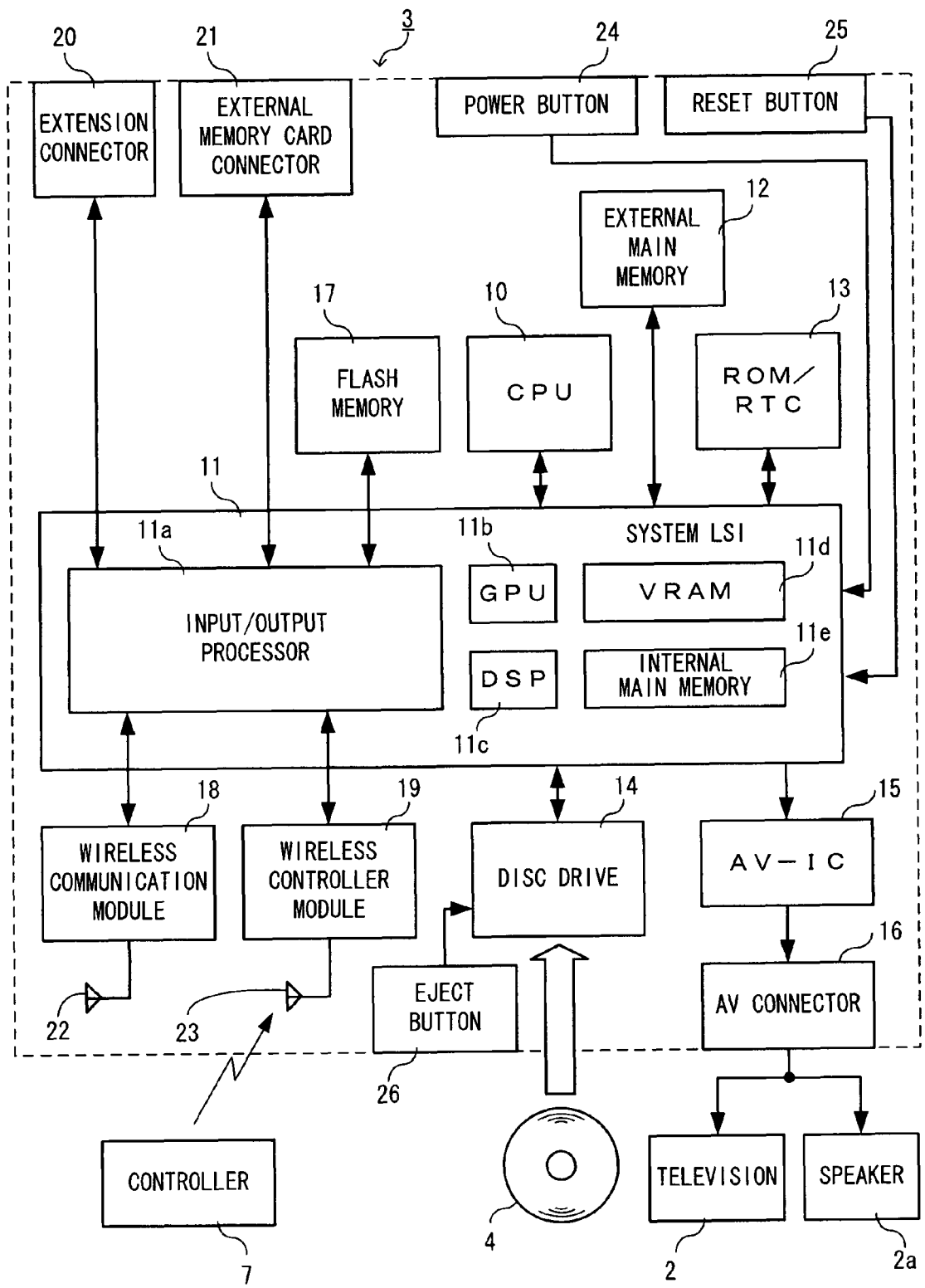
FIG. 2 is a functional block diagram of the game apparatus 3 of the present invention.

Next, with reference to FIG. 2, an internal configuration of the game apparatus 3 will be described. FIG. 2 is a functional block diagram illustrating a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by causing the game program stored on the optical disc 4 to be executed, and functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as control of data transmission between respective component parts connected thereto, generation of an image to be displayed, and obtainment of data from an external apparatus. An internal configuration of the system LSI will be described later. The external main memory 12, which is of a volatile type, stores programs such as a game programs read from the optical disc and the flash memory 17, and other various data, and is used as a work area and buffer space for the CPU 10. The ROM/RTC 13 includes a ROM (so-called a boot ROM) incorporating a program booting the game apparatus 3, and a clock circuit for counting time (RTC: Real Time Clock). The disc drive 14 reads, from the optical disc 4, the program data, texture data and the like, and writes the read data into an internal main memory lie described later, or the external main memory 12.

Further, provided in the system LSI 11 are an input/output (I/O) processor 11a, a GPU (Graphics Processor Unit) 11b, a DSP (Digital Signal Processor) 11c, a VRAM 11d, and the internal main memory 11e. These component parts 11a to 11e are, though not shown in diagrams, connected to one another via an internal bus.

The GPU 11b forms a part of a drawing means, and generates an image in accordance with a graphics command (draw command) from the CPU 10. More specifically, the GPU 11b generates game image data by performing, in accordance with the graphics command, calculation processing necessary to display 3D graphics, for example, coordinate conversion from 3D coordinates to 2D coordinates, which corresponds to processing before rendering, and final rendering processing such as texture pasting. Here, the CPU 10 provides the GPU 11b with not only the graphics command, but also an image generation program necessary to generate the game image data. The VRAM 11d stores data (such as polygon data and the texture data) necessary for the GPU 11b to execute the graphics command. When an image is generated, the GPU 11b generates the image data by using the data stored in the VRAM 11d.

The DSP 11c functions as an audio processor, and generates audio data by using sound data and sound waveform (tone quality) data stored on the internal main memory 11e and the external main memory 12.

The image data and the audio data generated as above described, is read by the AV-IC 15. The AV-IC 15 outputs the read image data to the television 2 via an AV connector 16, and also outputs the read audio data to a speaker 2a embedded in the television 2. Accordingly, the image is displayed on the television 2, and the sound is outputted from the speaker 2a.

The I/O processor 11a executes data transmission with component parts connected thereto and data downloading from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22 and is capable of communicating with other game apparatuses or various servers connected to the network. The I/O processor 11a accesses the flash memory 17 at regular intervals so as to detect data, if any, necessary to transmit to the network. If the data is detected, the detected data is transmitted to the network via the wireless communication module 18 and the antenna 22. Further, the I/O processor 11a receives data transmitted from the other game apparatuses or downloaded from a download server via the network, the antenna 22 or the wireless communication module 22, and stores the received data in the flash memory 17. The CPU 10 executes the game program so as to read the data stored in the flash memory 17 and causes the game program to use the read data. In the flash memory 17, not only the data transmitted between the game apparatus 3 and the other game apparatuses or the various servers, but also save data of a game (result data or intermediate step data of the game) played by using the game apparatus 3 may be stored.

Further, the I/O processor 11a receives the operation data transmitted from the controller 22 via the antenna 23 and the wired controller module 19, and (temporarily) stores the operation data in the internal main memory 11e or in a buffer space of the external main memory 12.

Further, to the I/O processor 11a, the extension connector 20 and the external memory card connector 21 are connected. The extension connector 20 is a connector for an interface such as a USB and a SCSI, and is capable of performing communication with the network, instead of the wireless communication module 18, by connecting thereto a medium such as an external storage, a peripheral device such as another controller, or a wired communication connector. The external memory card connector 21 is a connector for connecting the external storage medium such as the memory card. For example, the I/O processor 11a accesses the external storage medium via the extension connector 20 or the external memory card connector 21, and then saves data or reads data.

Provided to the game apparatus 3 are a power button 24, a reset button, 25, and an eject button 26. The power button 24 and the reset button 25 are connected to the system LSI 11. When the power button 24 is turned on, the power is supplied to the respective component parts of the game apparatus 3 via an AC adapter which is not shown. Further, when the power button 24 is pressed again during the state of the power being on, the state shifts to a low-power standby mode, where the power as small as one miniature bulb is applied. The power is supplied to the game apparatus 3 even in such state, and thus the game apparatus 3 can be always connected to the network such as the Internet. In the case of turning off the power after the power is turned on, it is possible to turn off the power by holding down the power button 24 for a predetermined time period or longer. When the reset button 25 is pressed, the system LSI 11 reactivates a start-up program of the game apparatus 3. The eject button 26 is connected to the disc drive 14. When the eject button 26 is pressed, the optical disc 4 is ejected from the disc drive 14.

Figure 3:
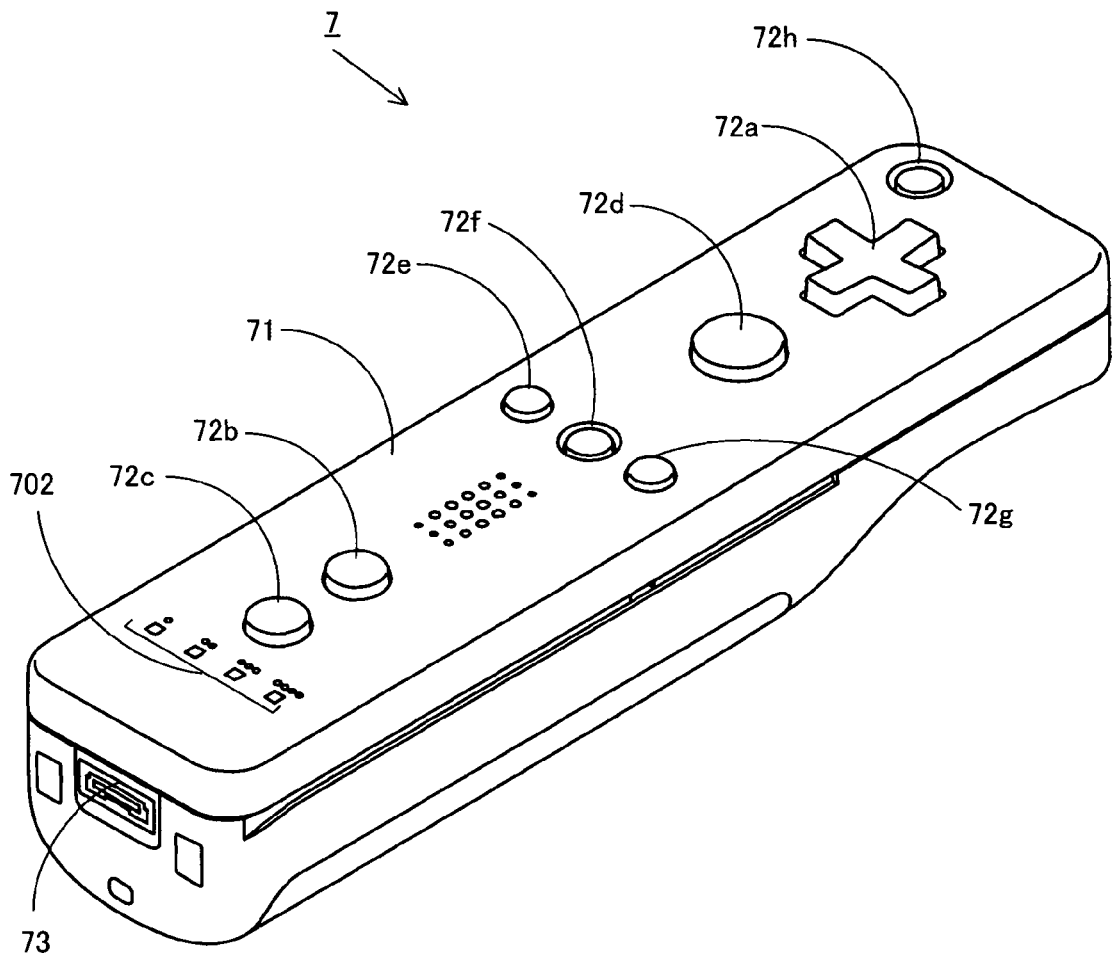
FIG. 3 is a perspective view of a controller 7 of FIG. 1 as viewed from a top rear side thereof.
Figure 3:
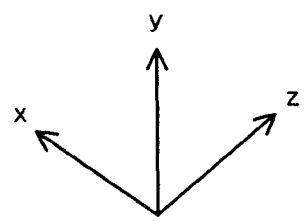
Figure 4:
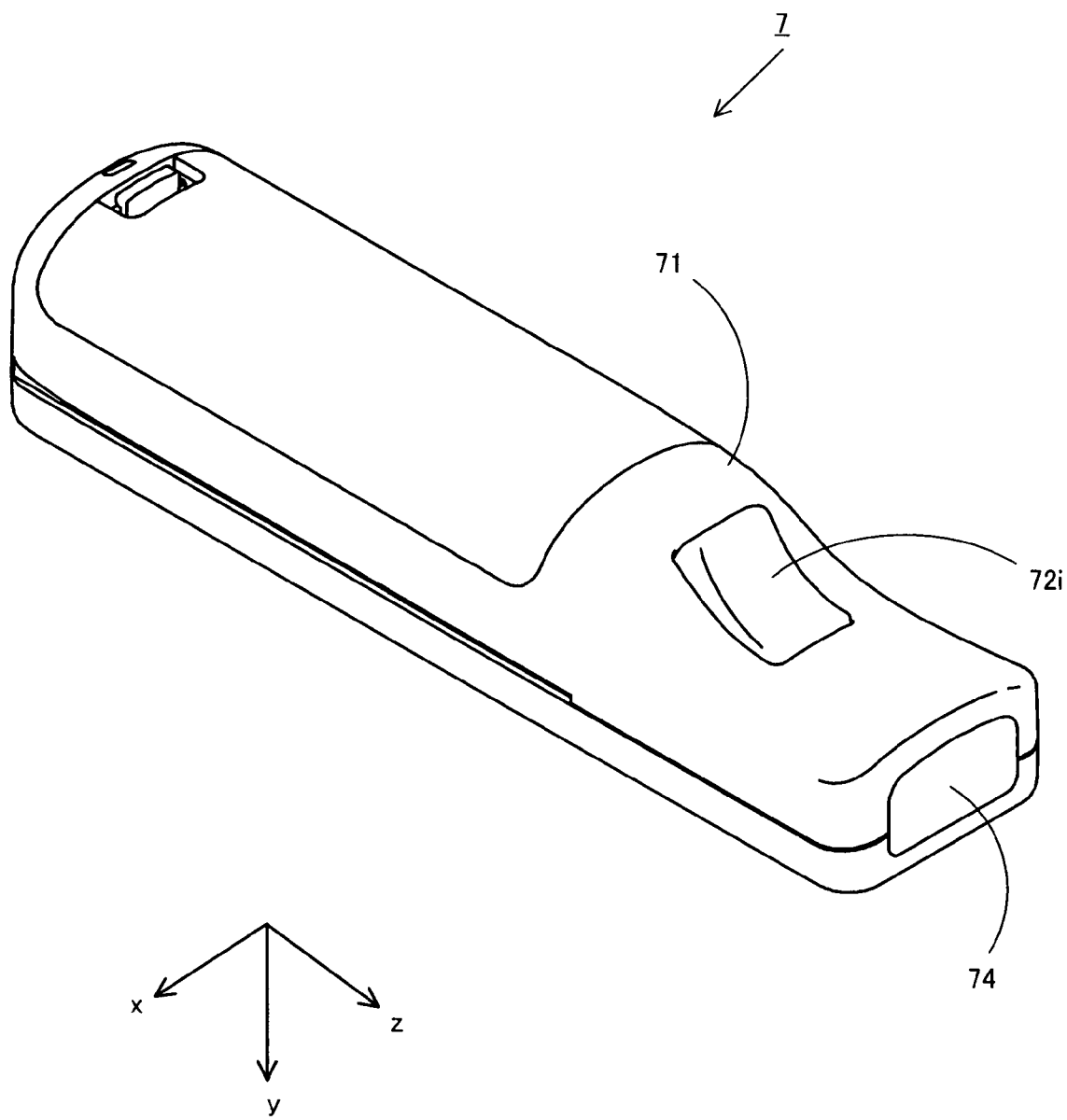
FIG. 4 is a perspective view of the controller 7 of FIG. 3 as viewed from a bottom front side thereof.

With reference to FIGS. 3 and 4, the controller 7 will be described. FIG. 3 is a perspective view of a controller 7 as viewed from a top rear side thereof. FIG. 4 is a perspective view of a controller 7 as viewed from a bottom front side thereof.

In FIGS. 3 and 4, the controller 7 includes a housing 71 and an operation section 72 composed of a plurality of operation buttons provided on the surface of the housing 71. The housing 71 of the present embodiment has a substantially parallelepiped shape extending in a longitudinal direction from front to rear, and an overall size thereof is small enough to be held by one hand of an adult or even a child. The housing 71 is formed by, for example, plastic molding.

At a front center portion of a top surface of the housing 71, a cross key 72a is provided. The cross key 72a is a cross-shaped four-direction push switch, and the operation portions thereof are respectively located on cross-shaped projecting portions arranged at intervals of 90 degrees such that the operation portions correspond to four directions (front, rear, right and left). A player selects one of the front, rear, right and left directions by pressing one of the operation portions of the cross key 72a. Through an operation of the cross key 72a, the player can, for example, indicate a direction in which a player character or the like appearing in a virtual game world is to move, or select an instruction from a plurality of choices.

The cross key 72a is an operation section for outputting an operation signal in accordance with the above-described direction input operation performed by the player, and such an operation section may be provided in another form. For example, the operation section may be such that four push switches are arranged in the cross directions and an operation signal is outputted by the player's pressing one of the four push switches. Further, in addition to the four push switches, a center switch may be provided at a center of the cross directions so as to provide an operation section compounded from four push switches and the center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touchpad.

Behind the cross key 72a on the top surface of the housing 71, a plurality of operation buttons 72b to 72g are provided. The operation buttons 72b to 72g are each an operation section for, when the player presses a head thereof, outputting an operation signal allocated thereto. For example, functions as a NO. 1 button, a NO. 2 button, an A button and the like are assigned to the operation buttons 72b to 72d. Further, functions as a minus button, a home button, a plus button and the like are assigned to the operation buttons 72e to 72g. Various operational functions are assigned to the operation buttons 72a to 72g in accordance with the game program executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged in a line on the top surface of the housing 71 in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player about the controller type which is currently set for the controller 7. Specifically, when the controller 7 transmits transmission data to the receiving unit 6, one of the plurality of LEDs 702 which corresponds to the controller type of the controller 7 is lit up.

On the top surface of the housing 71, speaker holes for emitting a sound from a speaker (a speaker 706 of FIG. 5), which is to be described later, to outside are formed between the operation button 72b and the operation buttons 72e to 72g.

On a bottom surface of the housing 71, a recessed portion is formed. As described later in detail, the recessed portion is formed in a position in which an index finger or middle finger of the player is located when the player holds the controller 7 with one hand and points a front portion thereof to the markers 8L and 8R. On a slope surface of the recessed portion, an operation button 72i is provided. The operation button 72i is an operation section acting as, for example, a B button.

On a front side surface of the housing 71, an image pickup element 743 constituting a part of an imaging information calculation section 74 is provided. The imaging information calculation section 74 is a system for analyzing image data picked up by the controller 7, thereby identifying an area having a high brightness in the image and detecting a position of a gravity center, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear side surface of the housing 71, a connector 73 is provided. The connector 73 is, for example, an edge connector, and is used for engaging and connecting the controller 7 with a connection cable.

For the sake of a specific description, a coordinate system set for the controller 7 will be defined. As shown in FIGS. 3 and 4, an x-axis, a y-axis, and a z-axis running at right angles to one another are defined with respect to the controller 7. Specifically, the z-axis represents a longitudinal direction of the housing 71, which corresponds to the front-rear direction of the controller 7, and a direction on the side of the front side surface (a portion on which the imaging information calculation section 74 is provided) of the controller 7 is set as a z-axis positive direction. Further, the y-axis represents an up-down direction of the controller 7, and a direction on the side of the top surface of the housing 71 is set as a y-axis positive direction. Still further, the x-axis represents the left-right direction of the controller 7, and a direction on the left side (a side which is not shown in FIG. 3, but shown in FIG. 4) of the housing 71 is set as an x-axis positive direction.

Figure 5:
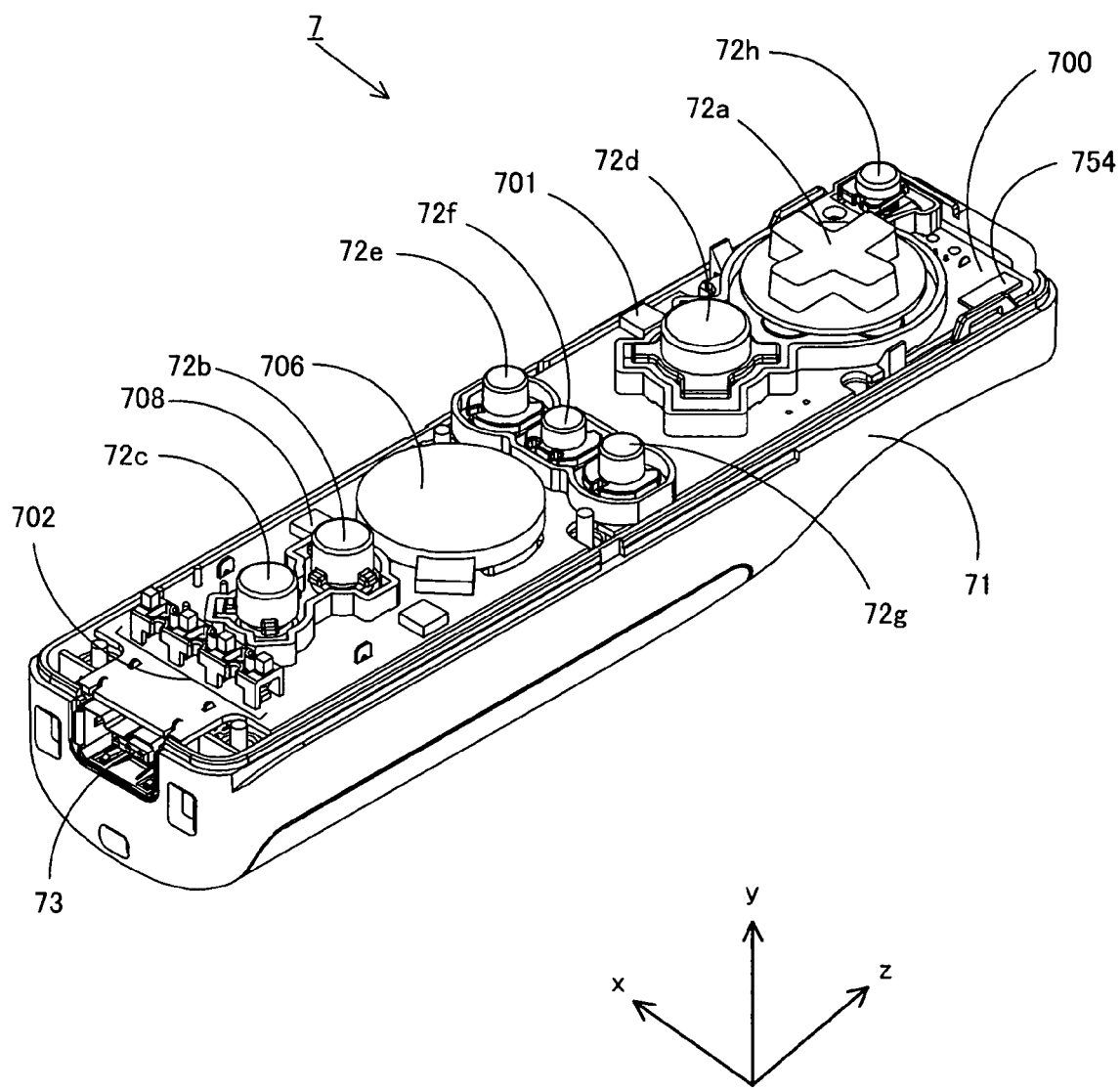
FIG. 5 is a perspective view of the controller 7 in a state where an upper casing thereof is removed.
Figure 6:
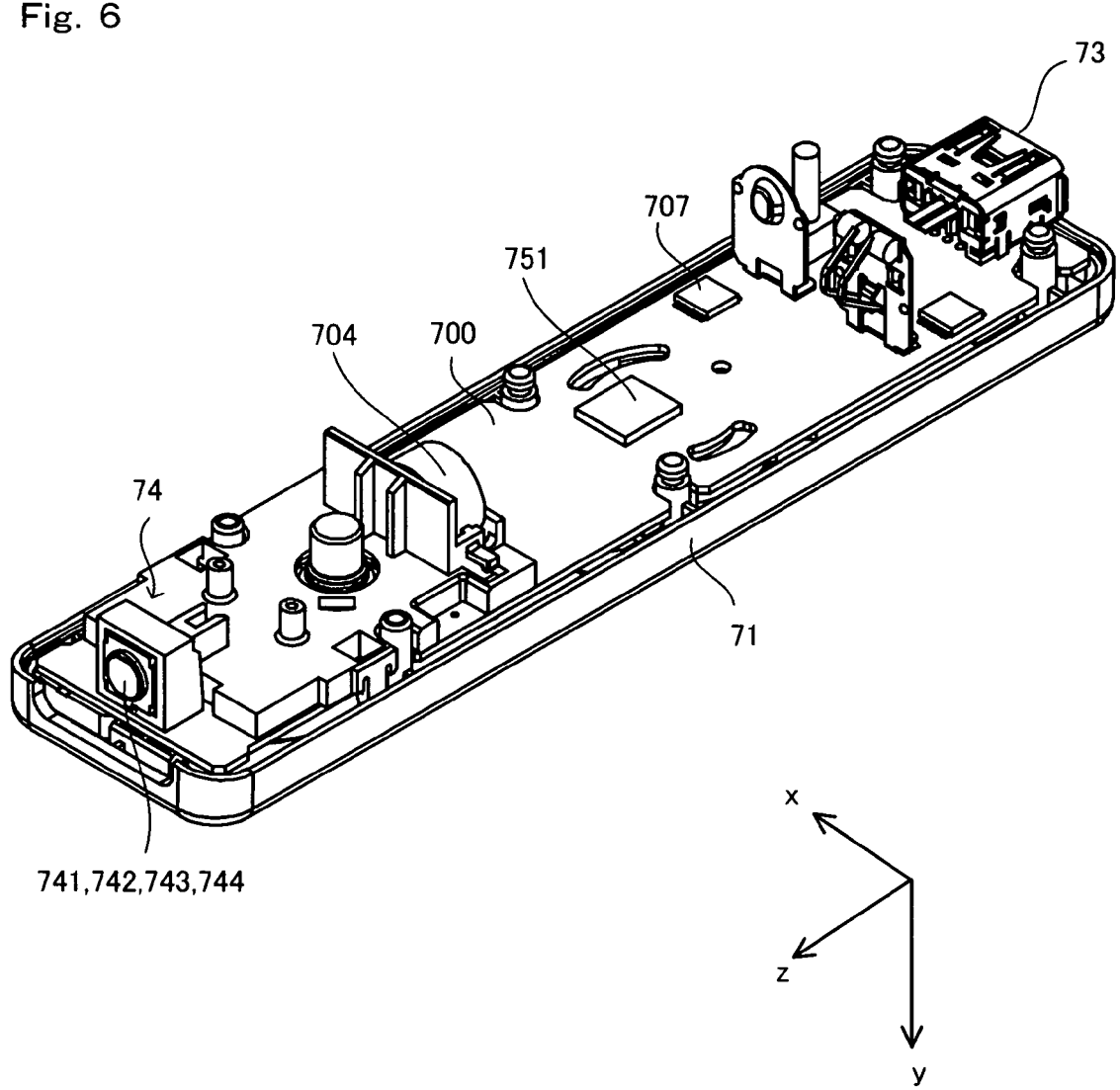
FIG. 6 is a perspective view of the controller 7 in a state where a lower casing thereof is removed.

With reference to FIGS. 5 and 6, an internal structure of the controller 7 will be described. FIG. 5 is a perspective view of the controller 7 in a state where an upper casing (a part of the housing 71) of the controller 7 is removed. FIG. 6 is a perspective view of the controller 7 in a state where a lower casing (a part of the housing 71) of the controller 7 is removed. FIG. 6 is a perspective view of a substrate 700 as viewed from a reverse side of the substrate 700 shown in FIG. 5.

As shown in FIG. 5, the substrate 700 is fixed inside the housing 71. Provided, on a top main surface of the substrate 700, are the operation buttons 72a to 72h, an acceleration sensor 701, the LEDs 702, an antenna 754 and the like. These elements are connected to a microcomputer 751 or the like (see FIGS. 6 and 7) bylines (not shown) formed on the substrate 700 or the like. A microcomputer 751 functions as an exemplary button data generation means of the present invention, and generates operation button data corresponding to the type of the operation button 72a or the like. This function is a technique in the public domain, and realized by the microcomputer 751 detecting connection/disconnection of lines which is caused by a switch mechanism such as a tactile switch located at a lower side of a key top. More specifically, when the operation button, for example, is pressed, the lines are connected, and consequently energized. The microcomputer 751 detects the lines which are energized, and generates a signal corresponding to the type of the operation button.

The wireless module 753 (see FIG. 7) and antenna 754, which are not shown, allow the controller 7 to act as a wireless controller. A quartz oscillator, which is not shown, is provided in an inside of the housing 71, and generates a reference clock of the microcomputer 751 described later. On the top main surface of the substrate 700, a speaker 706 and an amplifier 708 are provided. The acceleration sensor 701 is provide at the left side of the operation button 72d on the substrate 700 (that is, at a peripheral portion, instead of a center portion, on the substrate 700). Accordingly, the acceleration sensor 701 can detect, from a rotation centering on the longitudinal direction of the controller 7, acceleration caused by a centrifugal force element as well as directional variation in gravity acceleration. Accordingly, the game apparatus 3 and the like can detect, from the detected acceleration data, the rotation of the controller 7 highly sensitively in accordance with a predetermined calculation.

As shown in FIG. 6, at a front edge of a bottom main surface of the substrate 700, the image information calculation section 74 is provided. The image information calculation section 74 includes an infrared filter 741, a lens 742, the image pickup element 743 and an image processing circuit 744 which are located in this order from the front side of the controller 7. These elements are attached to the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 and the like, and outputs an audio signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704 is connected to the microcomputer 751 by the lines formed on the substrate 700, and is turned on/off in accordance with vibration data transmitted from the game apparatus 3. The controller 7 is vibrated when the vibrator 704 is turned on, and vibration is conveyed to the player holding the controller 7. Thus, a so-called vibration-feedback game is realized. The vibrator 704 is located at a relatively front side of the housing 71, and thus the housing 71 vibrates to a large extent while the player is holding the housing 71, whereby the player feels vibration sensitively.

Figure 7:
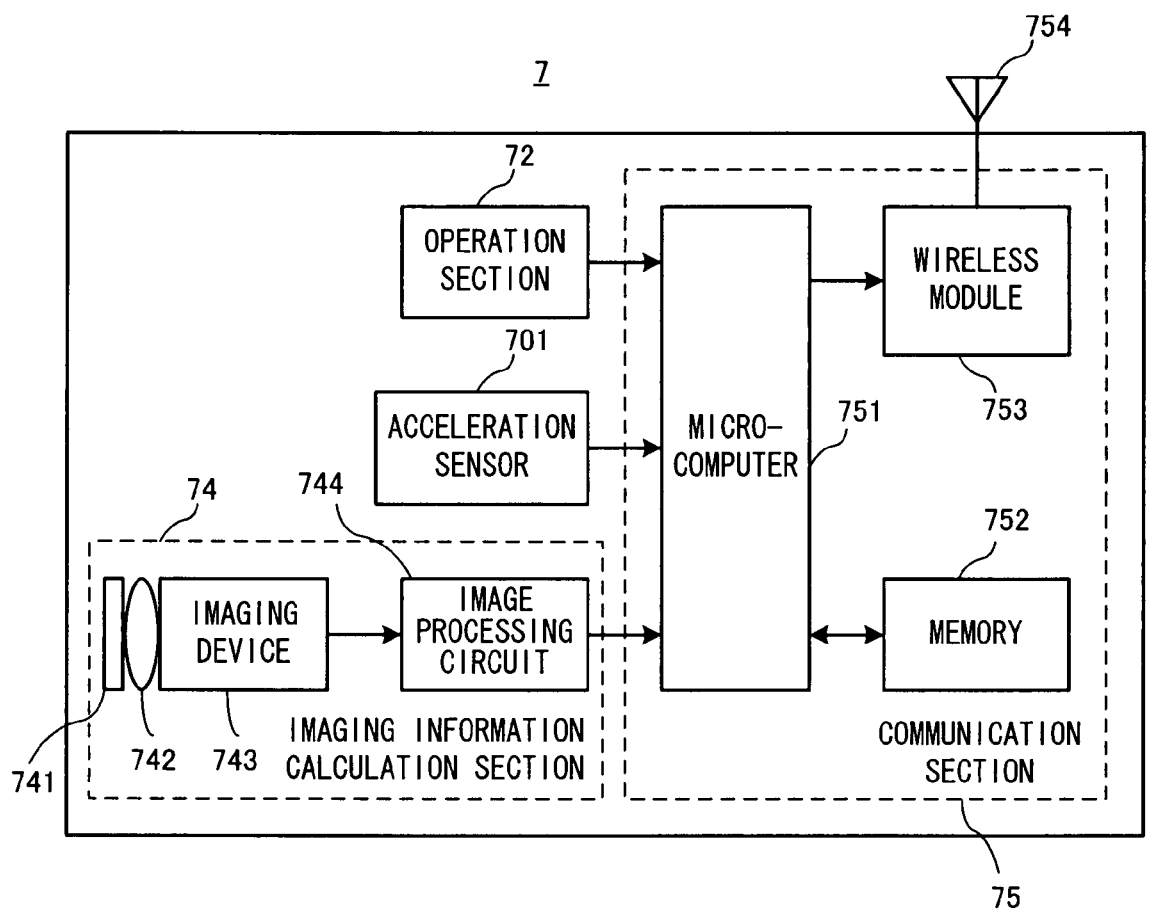
FIG. 7 is a block diagram illustrating a configuration of the controller 7 of FIG. 3.

With reference to FIG. 7, an internal configuration of the controller 7 will be described. FIG. 7 is a block diagram illustrating a configuration of the controller 7. As shown in FIG. 7, the controller 7 includes therein a communication section 75 as well as the above-described operation section 72, the imaging information calculation section 74, the acceleration sensor 701, the vibrator 704, the speaker 706, the sound IC 707, and the amplifier 708.

The image information calculation section 74 includes the infrared filter 741, a lens 742, the image pickup element 743 and the image processing circuit 744. The infrared filter 741 allows only an infrared radiation in the light incident on the front side of the controller 7 to pass therethrough. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation collected by the lens 742. In other words, the image pickup element 743 picks up the image of only the infrared radiation, which has passed through the infrared filter 741, and generates image data. The image data generated by the image pickup element 743 is processed by the image processing circuit 744. Specifically, the image processing circuit 744 processes the image data obtained from the image pickup element 743, detects a high brightness position thereof, and outputs, to the communication section 75, a process result data representing a result of detection of position coordinates and an area thereof. The imaging information calculation section 74 is fixed on the housing 71 of the controller 7, and an imaging direction of the controller 7 can be changed by changing the orientation of the housing 71 itself. As a result, in accordance with the imaging direction, a position of the high brightness position in the picked up image changes. That is, the process result data is information corresponding to the operation of the player. Therefore, in accordance with the process result data outputted from the imaging information calculation section 74, a signal corresponding to a position or a motion of the controller 7 can be obtained.

It is preferable that the controller 7 includes triaxial (x, y, and z-axes) acceleration sensor 701. The triaxial acceleration sensor 701 detects linear acceleration in three directions, i.e., an up-down direction, a left-right direction, and a front-rear direction. Further, in another embodiment, a biaxial accelerometer may be used which detects the linear acceleration in the up-down direction and the left-right direction (or any other paired direction) depending on a type of a control signal to be used for game processing. For example, the triaxial or biaxial acceleration sensor 701 may be of a type available from Analog Devices, Inc. or STMicroelectronics N.V. The acceleration sensor 701 may be of an electrostatic capacitance (capacitance-coupling) type which is based on silicon micro-machined MEMS (Micro Electro Mechanical Systems) technology. Any other suitable accelerometer technology (e.g., piezoelectric type or piezoresistance type) now existing or to be developed later may be used to provide the triaxial or biaxial acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along the respective two or three axes thereof. As a result, the acceleration sensor 701 cannot directly detect motion along a non-linear (e.g. arcuate) path, rotation, rotational motion, angular displacement, tilt, position, posture or any other physical characteristic.

However, through processing by a computer such as a processor of a game apparatus (e.g., a CPU 30) or a processor of a controller (e.g., the microcomputer 751), in accordance with the acceleration signals outputted from the acceleration sensor 701, additional information relating to the controller 7 can be inferred or calculated (determined), as one skilled in the art will readily understand from the description herein. For example, in the case where processing is performed by a computer based on the assumption that a controller accommodating the acceleration sensor is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor is facing a vertically downward direction is set as a standard state, it is possible to find out whether or not the axis to be detected is tilted depending on whether or not 1G (gravitational acceleration) is exerted, and also possible to find out the degree of tilt of the axis to be detected. Further, in the case of a multi-axial acceleration sensor, it is possible to find out, in detail, the degree of tilt of respective axes with respect to the gravity direction by processing the acceleration signals along the respective axes. In this case, the processor may calculate data of a tilt angle of the controller 7 in accordance with the output from the acceleration sensor 701, or alternatively infer an approximate tilt angle in accordance with the output from the acceleration sensor 701 without calculating data of the tilt angle. By using the acceleration sensor 701 and the processor in combination with each other in a manner as above described, it is possible to identify the tilt, an posture, and the position of the controller 7. On the other hand, in the case where it is assumed that the acceleration sensor is in a dynamic state, acceleration corresponding to the motion of the acceleration sensor can be detected, in addition to the gravitational acceleration element. Accordingly, as long as the gravitational acceleration element is removed through given processing, it is possible to calculate a motion direction and the like of the controller 7. Specifically, in the case where the controller 7 including the acceleration sensor 701 is dynamically accelerated and moved by a hand of a user, various motions and/or positions of the controller 7 can be calculated by processing the acceleration signal generated by the acceleration sensor 701. Even in the case where it is assumed that the acceleration sensor is in the dynamic state, it is possible to calculate a tilt toward the gravity direction as long as the acceleration corresponding to the motion of the acceleration sensor is removed through given processing. In another embodiment, the acceleration sensor 701 may includes a built-in type signal processing apparatus or a dedicated processing apparatus of any other type so as to desirably process the acceleration signal to be outputted from an embedded accelerometer before outputted to the microcomputer 751. For example, in the case where the acceleration sensor is designed to detect static acceleration (e.g., gravitational acceleration), the built-in type or the dedicated processing apparatus may convert the detected acceleration signal into a tilt angle (or any other desirable parameter) corresponding thereto.

In another embodiment, as a motion sensor for detecting the motion of the controller 7, the acceleration sensor 701, may be replaced with a gyro-sensor incorporating, for example, a rotating or vibrating element. An exemplary MEMS gyro-sensor that may be used in the embodiment is available from Analog Devices, Inc. Unlike the acceleration sensor 701, the gyro-sensor is capable of directly detecting rotation (or angular rate) around an axis of at least one gyroscopic element embedded therein. Thus, due to fundamental differences between a gyro-sensor and an acceleration sensor, processing performed on the output signals from these devices needs to be changed as appropriate, depending on which device is selected for a particular application.

Specifically, a significant change is performed in the case where the tilt and the posture are calculated by using the gyro-sensor instead of the acceleration sensor. That is, in the case of using the gyro-sensor, a value of the tilt is initialized at the time of starting detection. The angle rate data outputted from the gyro-sensor is integrated. Variation in tilt is then calculated from the initialized value of the tilt. In this case, the tilt to be calculated is a value corresponding to an angle. On the other hand, in the case where the tilt is calculated by the acceleration sensor, the tilt is calculated by comparing values of respective axes elements of the gravitational acceleration to predetermined standards corresponding thereto respectively. Accordingly, the tilt to be calculated can be represented by a vector, and thus an absolute direction detected by accelerometer can be detected without performing initialization. Further, a type of the value detected as the tilt is represented by the angle in the case of using the gyro-sensor, and is represented by the vector, on the other hand, in the case of using the acceleration sensor. Therefore, in the case of using the gyro-sensor instead of the acceleration sensor, the tilt data needs to be converted in an appropriate manner, in consideration of the difference between the two devices. Since characteristics of the gyro-sensor as well as fundamental differences between the accelerometer and the gyro-sensor are well known by the one skilled in the art, further descriptions thereof will be omitted. On the one hand, the gyro-sensor has the advantage of being capable of directly detecting rotation. On the other hand, the acceleration sensor is generally a cost-effective option as compared with the gyro-sensor when used for the controller of the present embodiment.

The communication section 75 includes the microcomputer 751, a memory 752, the wireless module 753 and the antenna 754. The microcomputer 751 controls the wireless module 753 for wirelessly transmitting the transmission data while using the memory 752 as a storage area at the time of processing. Further, the microcomputer 751 controls operation of the sound IC 707 and the vibrator 704 in accordance with the data received by the wireless module 753 from the game apparatus 3 via the antenna 754. The sound IC 707 processes the sound data and the like transmitted from the game apparatus 3 via the communication section 75. Further, the microcomputer 751 actuates the vibrator 704 in accordance with vibration data (e.g., a signal for turning the vibrator 704 "ON" or "OFF") and the like which is transmitted from the game apparatus 3 via the communication section 75.

Data from the controller 7 such as an operation signal (key data) from the operation section 72, acceleration signals (acceleration data in x-axis, y-axis, and z-axis directions, hereinafter simply referred to as acceleration data) from the acceleration sensor 701, and the process result data from the imaging information calculation section 74 are outputted to the microcomputer 751. The microcomputer 751 temporarily stores inputted data (the key data, the acceleration data and the process result data) in the memory 752 as the transmission data which is to be transmitted to a wireless controller module 52. Wireless transmission from the communication section 75 to the wireless controller module 52 is performed at predetermined time intervals. Since the game processing is generally performed at a cycle of ⅙₀ sec, the wireless transmission needs to be performed at a cycle of a shorter time period. Specifically, the game processing is performed at a cycle of 16.7 ms (⅙₀ sec), and a transmission interval of the communication section 75 which is composed of the Bluetooth® is 5 ms, for example. At a timing of performing a wireless transmission to the wireless controller module 52, the microcomputer 751 outputs, to the wireless module 753, the transmission data stored in the memory 752 as a series of pieces of operation information. The wireless module 753 uses, for example, the Bluetooth® technology so as to modulate the series of pieces of operation information by using a carrier wave having a predetermined frequency and to emit the modulated radio signal from the antenna 754. Thus, the key data from the operation section 72, the acceleration data from the acceleration sensor 701, and the process result data from the imaging information calculation section 74 which are all provided in the controller 7 are modulated by the wireless module 753 into the radio signal, and then transmitted from the controller 7. The antenna 52a and the wireless controller module 52 of the game apparatus 3 receives the radio signal, and the game apparatus 3 demodulates or decodes the radio signal to obtain the series of pieces of operation information (the key data, the acceleration data and the process result data). In accordance with the series of pieces of obtained operation information and the game program, the CPU 30 of the game apparatus 3 performs the game processing. In the case where the communication section 75 is configured by using the Bluetooth® technology, the communication section 75 may have a function of receiving transmission data which is wirelessly transmitted from the other devices.

An outline of the game processing in the present embodiment performed by the game apparatus 3 having the above-described configuration will be described. FIG. 8 is a diagram illustrating a positional relation between the direction of the controller 7 and the television 2 (markers 8L and 8R). In FIG. 8, the front side surface of the controller 7 (a side on which the imaging information calculation section 74 is located) is pointing the front side of the television 2. In this case, in an image picked up by the image pickup element 40 of the controller 7, as shown in FIG. 9, 8L' and 8R', which are, respectively, images of the markers 8L and 8R, are aligned side by side on the right and left. As above described, the image processing circuit 744 of the controller 7 detects the high brightness positions (corresponding to the images of the markers 8L and 8R) by processing the picked up image obtained from the image pickup element 743, and then outputs process result data which represents a detection result relating to position coordinates and areas thereof. Hereinafter, the process result data is referred to as imaging information. FIG. 10 is a diagram illustrating exemplary imaging information. In the present embodiment, as shown in FIG. 10, the coordinates indicating the respective positions of the above-described two markers are transmitted as the imaging information from the controller 7 to the game apparatus 3. In the present embodiment, the game apparatus 3 calculates a midpoint of the two markers, and performs predetermined game processing (e.g., a gun shooting game and the like) by setting the midpoint as pointing coordinates on the screen of the television 2.

With reference to FIG. 11, a case where the controller 7 is not pointing the television 2 will be described. In FIG. 11, the front side surface of the controller 7 is pointing the right side of the television 2. In this case, the markers 8L and 8R are not included within an imaging range picked up by the controller 7. Therefore, as shown in FIG. 12, an image picked up is an image without including the markers. In this case, as shown in FIG. 13, a NULL code (alternatively, a NULL value) is set instead of the coordinates of the respective markers, and transmitted as the imaging information. As a result, the game apparatus cannot calculate the above-described pointing coordinates in accordance with the imaging information. Accordingly, in the present embodiment, the imaging information as above described is regarded as invalid data. In other words, in the present embodiment, the data including the NULL code is regarded as invalid data since the pointing coordinates thereof cannot be calculated, and data without including the NULL code (see FIG. 10) is regarded as valid data.

Further, in the case where only either of marker 8L or 8R is included in the imaging range, as shown in FIG. 14, for example, an image including only one marker 8L' is picked up. In this case, as shown in FIG. 15, for example, NULL is set to the coordinates of the marker to indicate the imaging information thereof. Even in this case, the game apparatus cannot calculate the above-described pointing coordinates (the midpoint) in accordance with the imaging information, and thus the information data is regarded as invalid data. That is, in the present embodiment, in the case where the imaging information includes at least one NULL code, the imaging information is regarded as invalid data.

Figure 16:
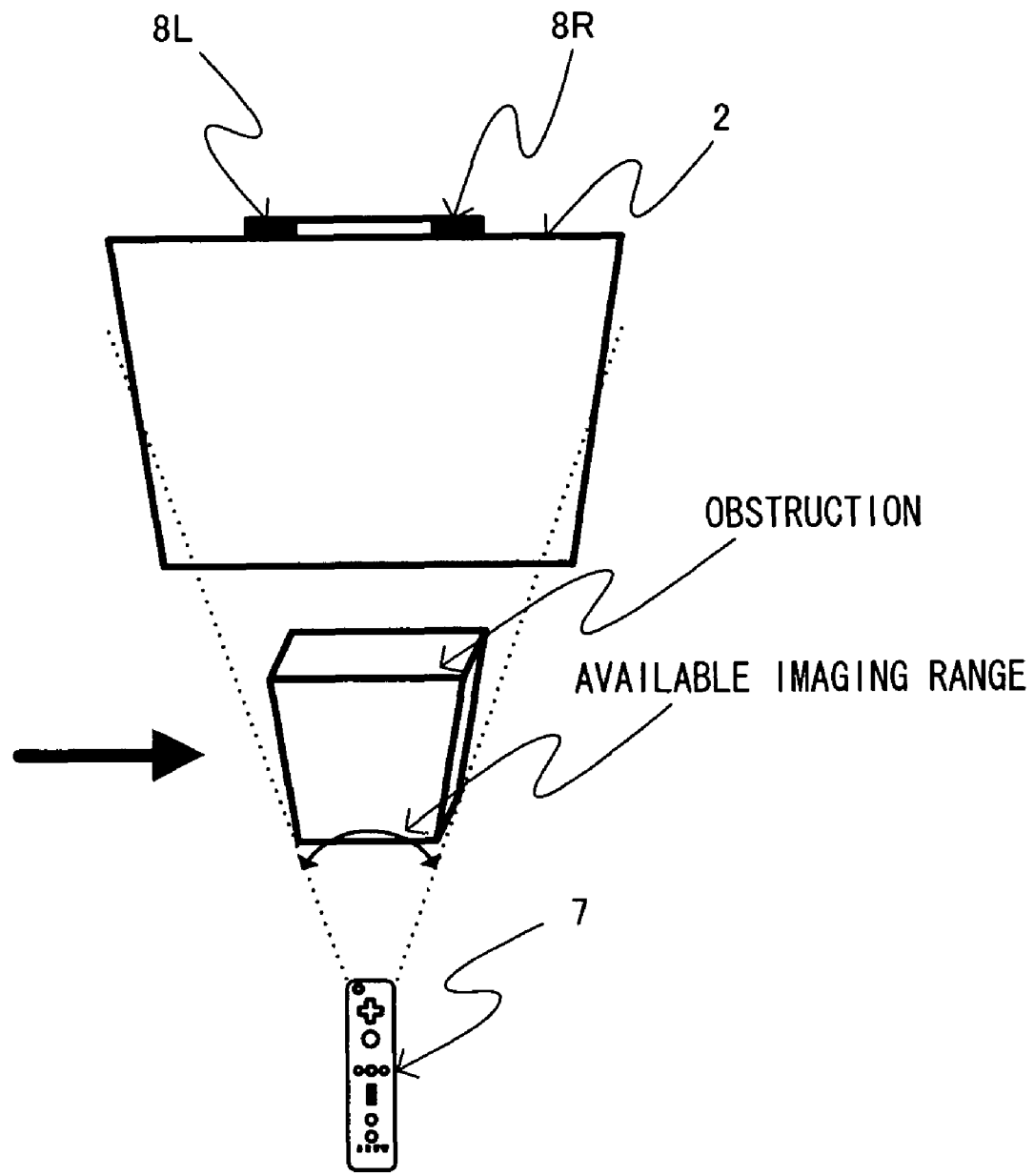
FIG. 16 is a diagram illustrating a positional relation between the controller 7 and a television 2 (markers 8L and 8R) in the case where there is an obstruction therebetween.
Figure 17:
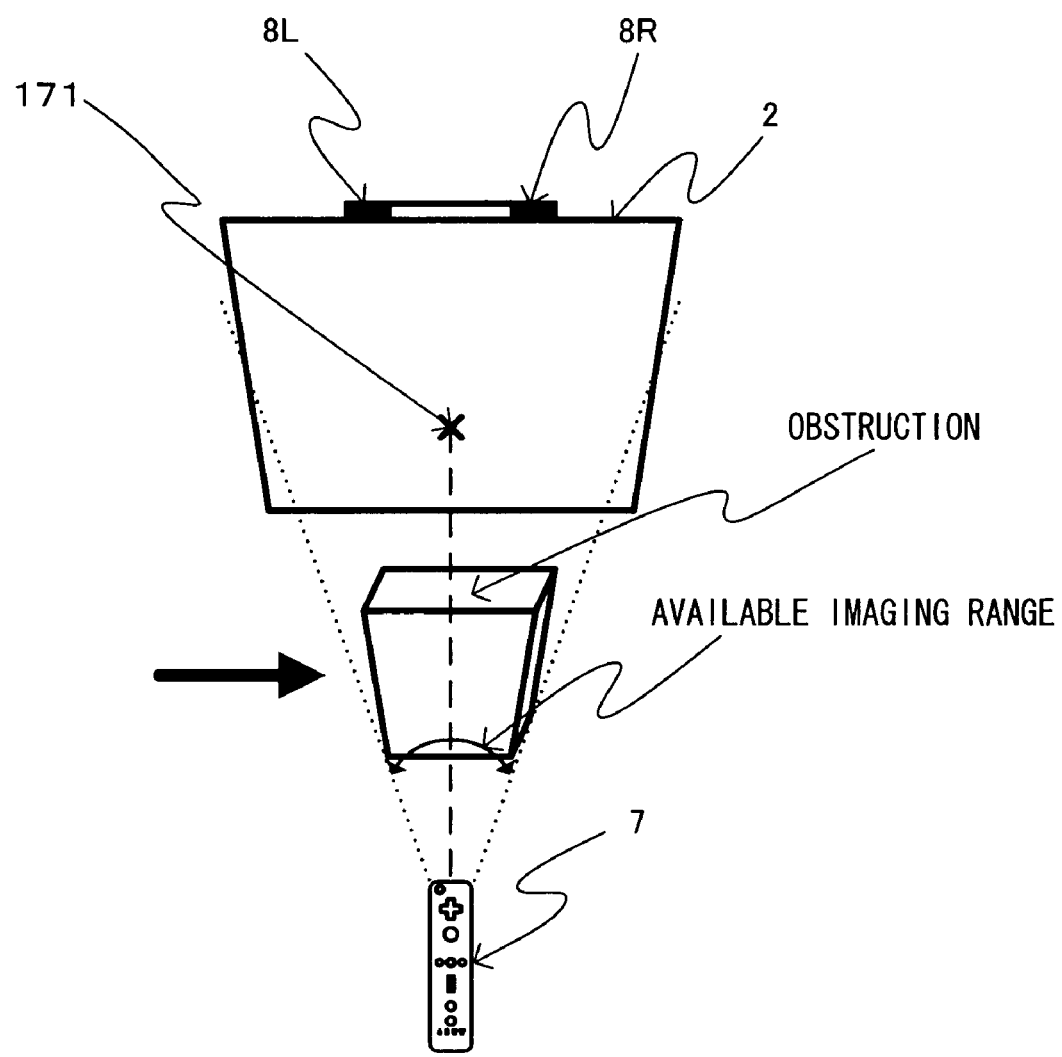
FIG. 17 is a diagram illustrating a positional relation between the controller 7 and a television 2 (markers 8L and 8R) in the case where there is an obstruction therebetween.

Next, a case where an obstruction exists between the controller 7 and the television 2 (the markers 8) will be described. In the situation of the above-described FIG. 8, if an obstruction, for example, a person appears between the controller 7 and the television 2 (the markers 8), the controller 7 is blocked with the obstruction, as shown in FIG. 16, and consequently cannot pick up the image of the markers 8L and 8R. As a result, the image picked up is such as shown in the above-described FIG. 12, and the imaging information is, as shown in the above-described FIG. 13, information including the NULL code. Further, in the case where the positional relation is such that the obstruction blocks only either of the markers 8R or 8L, as shown in the above-described FIG. 15, the imaging information has the coordinates information in which either of the markers is NULL. In the conventional art, such case has been processed as a situation as shown in the above-descried FIG. 11, that is, the situation where the controller 7 is pointing outside of a screen of the television 2. However, in the present invention, the imaging information obtained before the markers 8L and 8R become unpickupable is used for such case. That is, predetermined game processing is performed by using the pointing coordinates designated immediately before the markers 8L and 8L are blocked with the obstruction. As a result, as shown in FIG. 17, for example, even if there is an obstruction, processing can be performed by regarding a point 171 on the screen of the television 2 as the pointing coordinates.

For performing such processing, it is necessary to identify the situation, when the above-described invalid data is received, whether the controller 7 is pointing outside of the screen of the television 2, as shown in the above-described FIG. 11, or the controller 7 is pointing the screen of the television 2 but cannot pick up the image of the markers 8L and 8R due to an obstruction existing therebetween, as shown in FIG. 16. Therefore, in the present invention, a magnitude of the motion of the controller 7 is determined when invalid data is transmitted to the game apparatus. For example, in the case where the controller 7 is moved, from a situation where the controller 7 is pointing the front side as shown in FIG. 8, so as to point outside of the television 2 as shown in FIG. 11, the motion is considered as a large motion. On the other hand, in the case where, under the situation as shown in FIG. 8, an obstruction appears between the controller 7 and the television 2 as shown in FIG. 16, the controller 7 is considered to be moved a little or hardly moved. Therefore, in the present invention, the magnitude of the motion of the controller 7 is identified when invalid data is transmitted to the controller 7. Accordingly, it is determined that a case where the motion is large corresponds a situation in which the controller 7 is pointing outside of the television 2, as shown FIG. 11, and that a case where the motion is small corresponds to a situation in which an obstruction exists, as shown in FIG. 16. When the obstruction exists, the pointing coordinates designated most recently is used as current pointing coordinates. That is, in the case where it is determined that the motion of the controller 7 is small when the invalid data is transmitted to the game apparatus, the markers 8L and 8R are considered to be blocked temporarily with an obstruction or the like, and thus the most recent data among valid data previously obtained is used, whereby the processing which has been performed until that time point can be continued.

Figure 18:
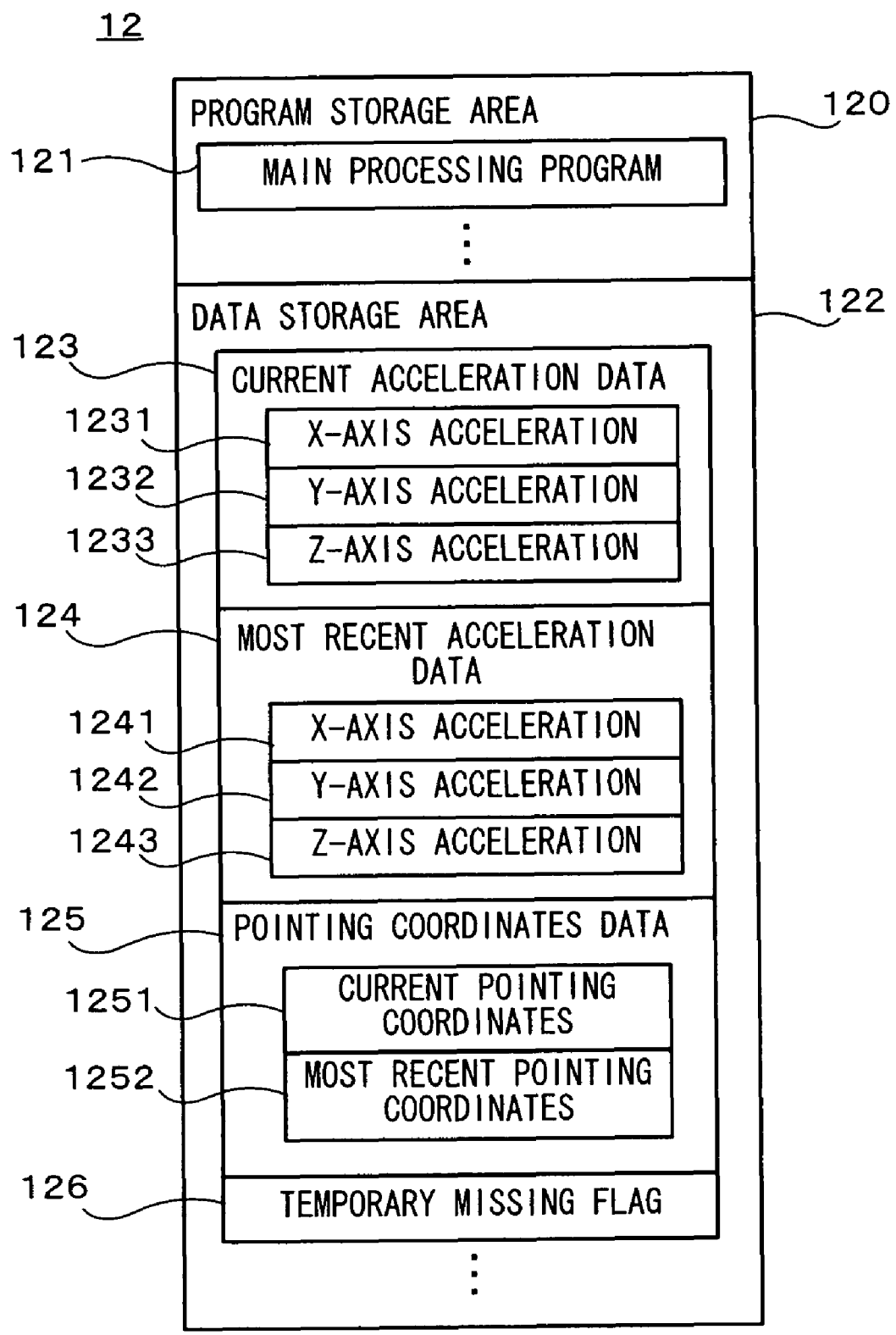
FIG. 18 is a diagram illustrating a memory map of an external main memory 12.

Various data used in the present embodiment will be described. FIG. 18 is a diagram illustrating a memory map of the external main memory 12 as shown in FIG. 2. In FIG. 18, the external main memory 12 includes a program storage area 120, and a data storage area 122.

The program storage area 120 stores a program executed by the CPU 10, and the program is composed of a main processing program 121 and the like.

In the data storage area 122, data such as current acceleration data 123, and most recent acceleration data 124 and pointing coordinates data 125, and flags such as a temporary missing flag 126 are stored.

The current acceleration data 123 is acceleration data included in a series of pieces of operation information transmitted from the controller 7 as transmission data. The current acceleration data 123 includes x-axis acceleration 1231, y-axis acceleration 1232, and z-axis acceleration 1233 which are detected by the acceleration sensor 701 from three axial elements of the x-axis, the y-axis and the z-axis, respectively. The receiving unit 6 which is accommodated in the game apparatus 3 receives the current acceleration data 123 included in the operation information transmitted from the controller 7 at predetermined time intervals, for example, at every 5 ms intervals, and store the same in a buffer, which is not shown and accommodated in the receiving unit 6. The current acceleration data 123 is then read on a frame-by-frame basis, which is a processing interval thereof, and stored in the external main memory 12. Further, the current acceleration data 123 takes values in a range between −2G and +2G.

Figure 19:
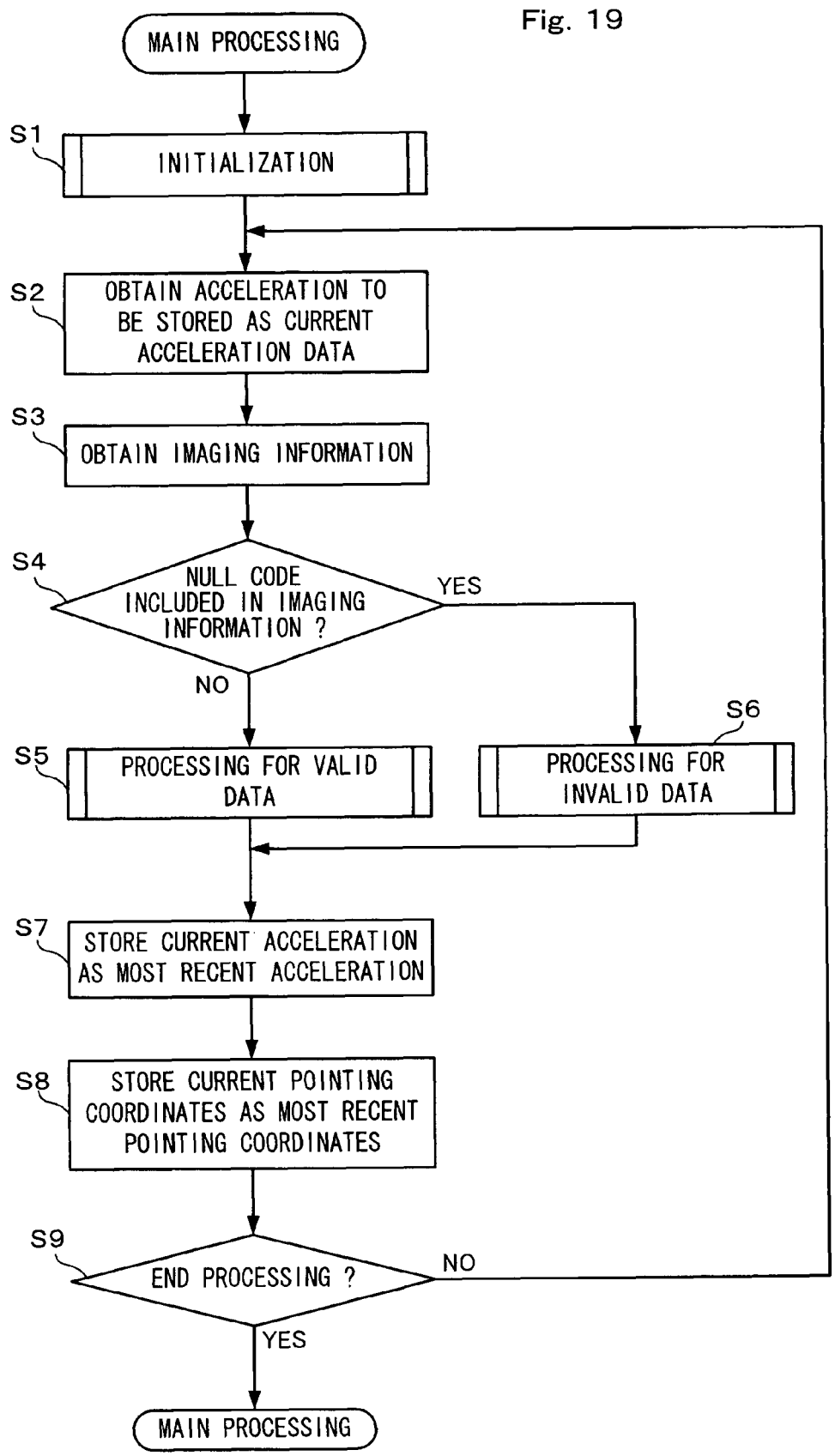
FIG. 19 is a flowchart illustrating a whole process executed in the game apparatus 3.

The most recent acceleration data 124 represents acceleration data calculated in a most recent processing loop. Here, the processing loop means a processing loop composed of steps 2 to 9 as shown in FIG. 19. The processing loop is repeated on a frame-by-frame basis, and one frame corresponds to the above-described processing intervals. Since a file layout of the most recent acceleration data 124 is the same as that of the current acceleration data 123, the description thereof will be omitted.

The pointing coordinates data 125 is data calculated based on the imaging information included in the series of pieces of operation data transmitted from the controller 7 as the transmission data, and also is data representing the pointing coordinates on the screen. The pointing coordinates data 125 includes the current pointing coordinates 1251 and the most recent pointing coordinates 1252. The current pointing coordinates 1251 are data representing pointing coordinates in the current processing loop. The most recent pointing coordinates 1252 are data representing pointing coordinates in a processing loop immediately prior to the current processing loop. Specifically, coordinates of the midpoint of the markers 8L and 8R are stored as the pointing coordinates in accordance with the above-described imaging information (see FIG. 10) transmitted from the controller 7.

The temporary missing flag 126 is a flag to determine, when the imaging information is invalid data, whether the reason of the invalidity is caused by a temporary obstruction, or by a situation where the controller 7 is pointing outside of the screen. That is, the temporary missing flag 126 is a flag to determine, when the invalid data is transmitted, whether the situation is such as shown in above-described FIG. 11 or such as shown in FIG. 16. A case where the flag is off represents a situation where the controller 7 is pointing outside of the screen, as shown in FIG. 11. On the other hand, a case where the flag is on represents a situation where the controller 7 and the markers 8L and 8R are blocked by the obstruction as shown in FIG. 16.

With reference to FIGS. 19 to 22, the game processing executed by the game apparatus 3 will be described. FIG. 19 is a flowchart illustrating a whole process of the processing executed by the game apparatus 3. Note that in the present embodiment, the processing loop of steps 2 to 9 as shown in FIG. 19 is executed repeatedly at an interval of 1/60 secs., as above described. This is because it is assumed, in the game processing of the present embodiment, that video data of the screen is created and outputted at an interval of 1/60 secs. In the flowcharts shown in FIGS. 19 to 22, processing relating the imaging information will be mainly described, and description about other game processing which is not directly related to the present invention will be omitted. Note that, in FIGS. 19 to 22, steps executed by the CPU 30 are each abbreviated to "S".

Figure 20:
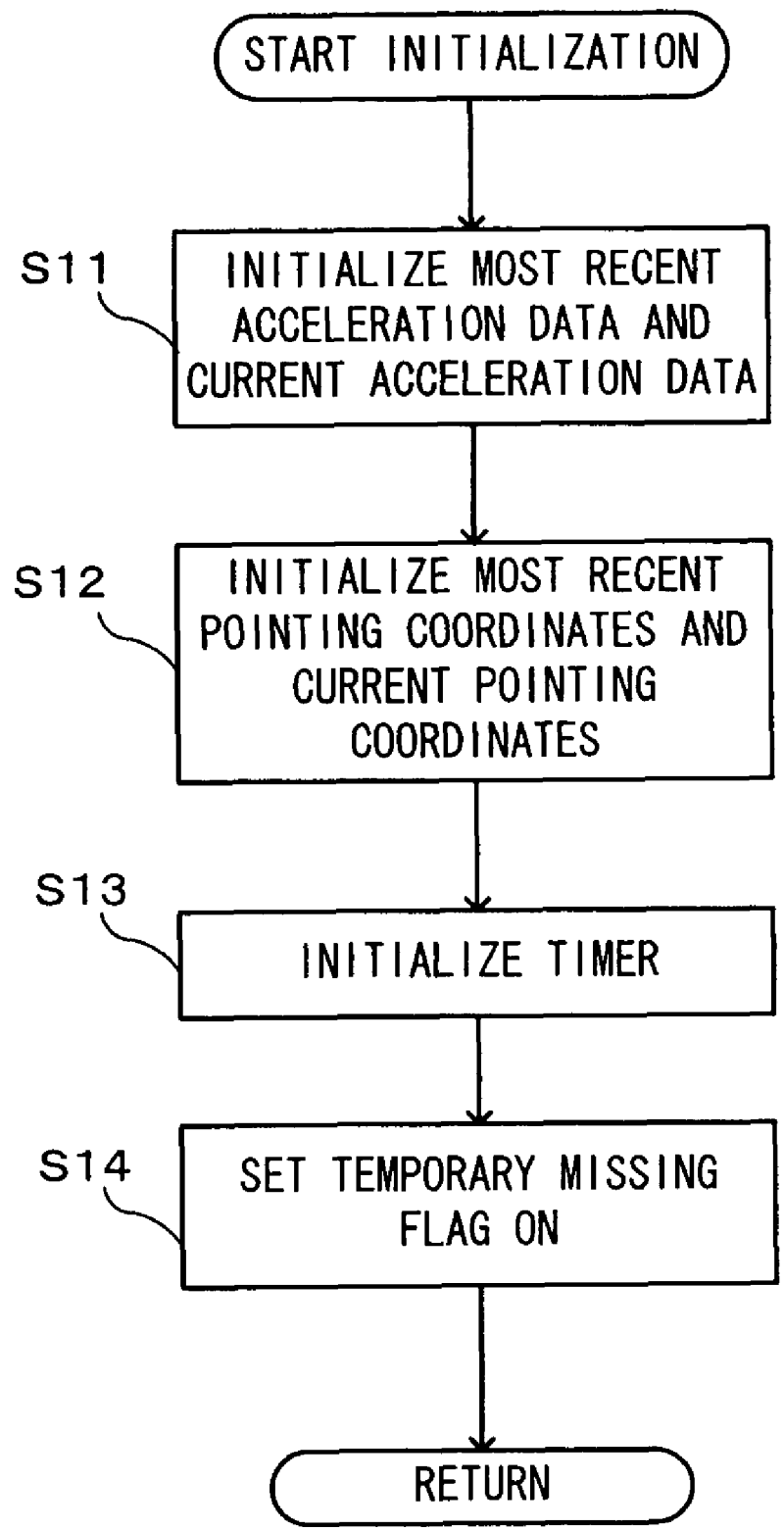
FIG. 20 is a flowchart illustrating, in detail, initialization as shown in step 1 of FIG. 19.

First, initialization to initialize various data and flags are performed (step 1). FIG. 20 is a flowchart illustrating, in detail, the initialization as shown in the above-described step 1. In FIG. 20, the current acceleration data 123 and the most recent acceleration data 124 are initialized (step 11). Next, the current pointing coordinates 1251 and the most recent pointing coordinates 1252 are initialized (step 12).

Further, a timer is initialized (step 13). The timer is used to measure a duration time of a situation where the imaging information transmitted from the controller 7 is kept being invalid data. The timer is used to determine, when the invalid imaging information is transmitted from the controller 7, whether or not the imaging information calculation section 74 of the controller 7 is intentionally blocked, or for example, whether or not a player covers the front side of the controller 7 with the player's hand. Finally, the temporary missing flag 126 is set to "ON" as its initial setting (step 14), and the initialization is completed.

Returning to FIG. 19, the acceleration data outputted from the controller 7 is obtained and then stored as the current acceleration data 123 in the external main memory 12 (step 2).

The above-described imaging information outputted from the controller 7 is obtained (step 3). Next, it is determined whether or not the obtained imaging information includes the NULL code as above described (step 4). That is, it is determined whether or not the imaging information is invalid data. As a result of the determination, when the NULL code is not included ("NO" in step 4), the imaging information is regarded as valid data, whereby processing for the valid data is performed (step 5). On the other hand, when the NULL code is included ("YES" in step 4), the imaging information is regarded as invalid data information, and processing for the invalid data is performed (step 6).

Figure 21:
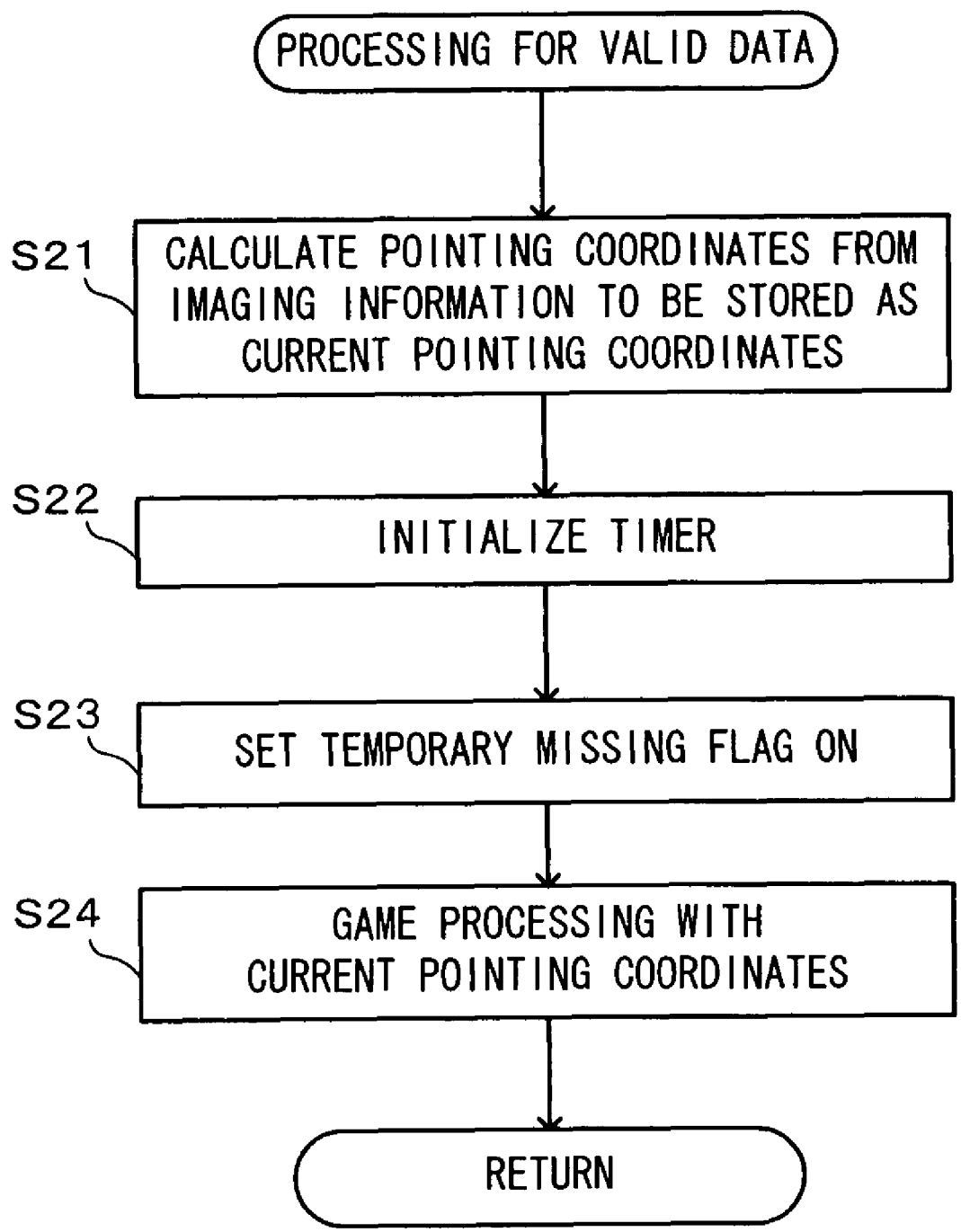
FIG. 21 is a flowchart illustrating, in detail, processing for valid data as shown in step 5 of FIG. 19.

FIG. 21 is a flowchart illustrating, in detail, the processing for the valid data as shown in above-described step 5. In FIG. 21, based on the imaging information obtained in above-described step 3, the pointing coordinates are calculated. Specifically, the midpoint of the markers 8L and 8R is calculated as the pointing coordinates. The calculated pointing coordinates are stored as the current pointing coordinates 1251 in the external main memory 12 (step 21).

Next, the timer is initialized (step 22), and the temporary missing flag 126 is set to "ON" (step 23).

Predetermined game processing using the above-described current pointing coordinates 1251 is performed (step 24). For example, processing for displaying a cursor at a position on the screen indicated by the current pointing coordinates 1251 is performed. Alternatively, in the case of the game processing including the gun shooting game, processing is performed so as to display a bullet being landed on the current pointing coordinates 1251. This is the end of the processing for the valid data.

Figure 22:
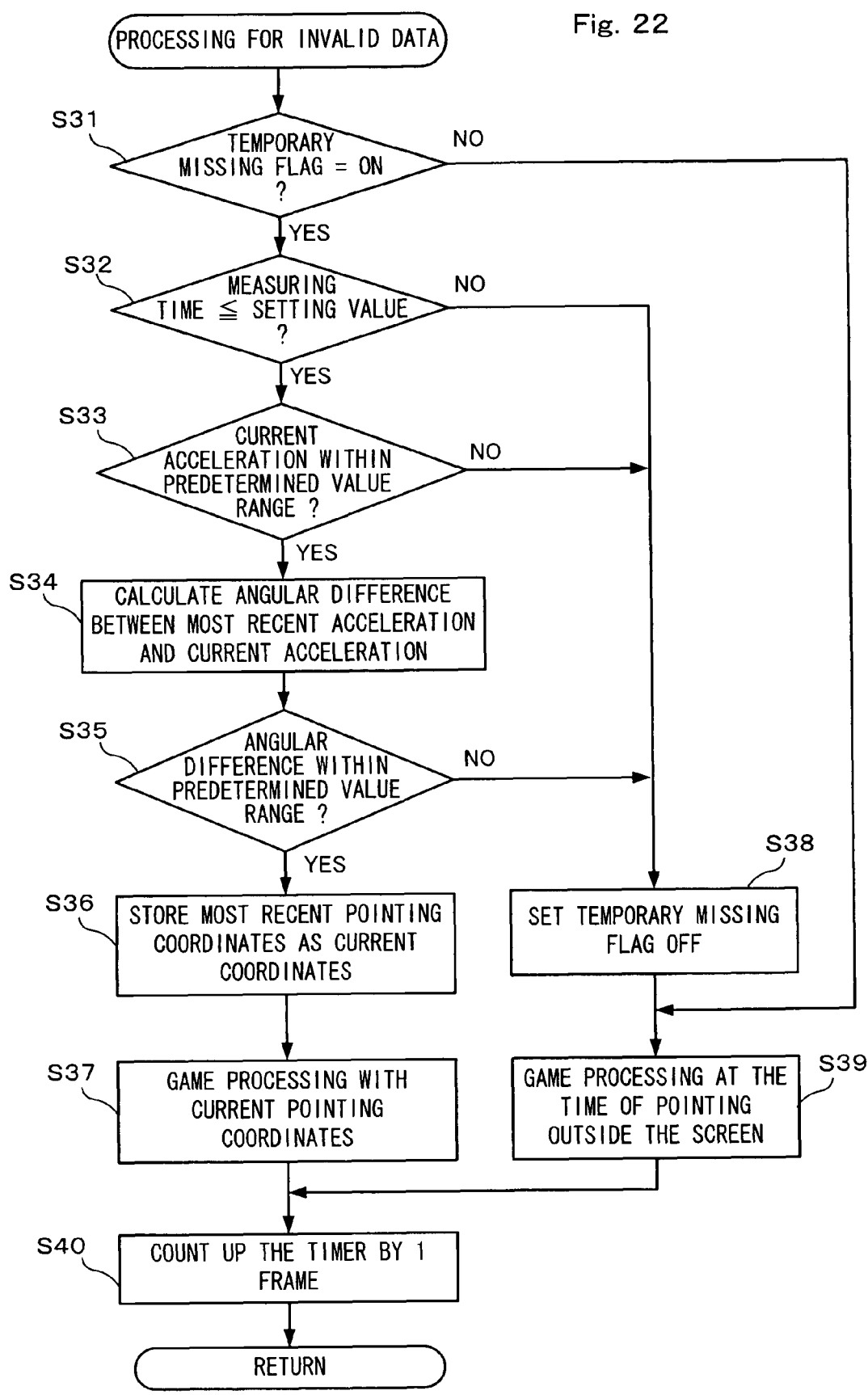
FIG. 22 is a flowchart illustrating, in detail, processing for invalid data the as shown in step 6 of FIG. 19.

Next, with reference to FIG. 22, the processing for the invalid data as shown in above-described step 6 will be described. In FIG. 22, first, it is determined whether or not the temporary missing flag 126 is "ON" or not (step 31). In the case where the temporary missing flag 126 is not "ON" ("NO" in step 31), as a result of the determination, it is considered that the controller 7 is pointing outside of the screen as shown in above-described FIG. 11, and thus processing proceeds to step 39 described later.

On the other hand, in the case where it is determined that the temporary missing flag 126 is "ON" ("YES" in step 31), a predetermined value is compared to the time measured by the above-described timer (step 32). The comparison is performed so as to determine whether or not an intentional blocking, such as a case, for example, where the player covers the front side surface (the side of the imaging information calculation section 74) of the controller 7 with the player's hand, occurs. When it is determined, as a result of the determination, that the time measured by the timer is not equal to or smaller than the predetermined value ("NO" in step 32), it is considered that the front side surface of the controller 7 is covered intentionally, and thus processing proceeds to step 38 described later.

On the other hand, when it is determined that the time measured by the timer is equal to or smaller than the predetermined value ("YES" in step 32), the current acceleration data 123 is read from the external main memory 12, and then it is determined whether or not the acceleration value represented by the current acceleration data 123 is within a predetermined value range (step 33). Such determination is made in order to identify whether the controller 7 makes a large motion, or just stays within a small motion, instead of the large motion. As the predetermined value range, a range of values close to 1G, for example, a range between 0.8G and 1.2G is considered. If the acceleration (gravitational acceleration) toward the direction of the gravitational force of the earth is assumed to be 1G, when the controller 7 is in a static state, 1G gravitational acceleration acts on the controller 7. In the case where the motion of the controller 7 is small, fluctuation range in the acceleration will be also small. Therefore, in the case where the motion of the controller 7 is small, the acceleration thereof is considered to stay close to 1G.

In the case where, as a result of the determination in step 33, it is determined that the current acceleration data 123 is not within the predetermined value range ("NO" in step 33), it is considered that the acceleration is relatively large, that is, a relatively large motion is applied to the controller 7. In this case, processing proceeds to step 38 described later. On the other hand, in the case where the current acceleration data 123 is within the predetermined value range ("YES" in step 33), an angular difference between the current acceleration data and the most recent acceleration data is calculated (step 34). Specifically, the current acceleration vector is first calculated by performing vector synthesis of the three axial gravitational acceleration elements represented by the current acceleration data 123. Next, the most recent acceleration vector is calculated by performing vector synthesis of the three axial gravitational acceleration elements represented by the most recent acceleration data 124. The angular difference between the current acceleration vector and the most recent acceleration vector is then calculated.

After the angular difference is calculated, it is determined whether or not the angular difference is within a predetermined value range (step 35). The determination is performed in order to improve the determination accuracy with respect to the magnitude of the motion of the controller 7, as above described. In the case where, as a result of the determination, the angular difference is not within the predetermined value range ("NO" in step 35), it is considered that the motion of the controller is large. Therefore, it is considered that it is not in the situation where the markers 8L and 8R are blocked by the obstruction, as shown in above-described FIG. 16, but in the situation where the controller 7 is pointing outside of the screen as shown in above-described FIG. 11. In this case, processing proceeds to step 38 described later. On the other hand, in the case where the above-described angular difference is determined to be within the predetermined value range ("YES" in step 35), the motion of the controller 7 is considered to be small. That is, it is considered that since the controller 7 hardly moves, and still points the direction of the screen, and consequently it is considered that the markers 8L and 8R are blocked by an obstruction, as shown in FIG. 16. In this case, the most recent pointing coordinates 1252 are stored in the external main memory 12 as the current pointing coordinates 1251 (step 36).

Predetermined game processing is then performed with the use of the current pointing coordinates 1251 (step 37). For example, processing is performed, for example, such that a cursor is displayed at a position, on the screen, corresponding to the current pointing coordinates 1251. Accordingly, when the imaging information becomes invalid data due to blocking of the markers 8L and 8R by the obstruction, it is possible to perform or keep performing the predetermined game processing, which is supposed to be performed if the imaging information is valid, by utilizing the pointing coordinates used most recently.

On the other hand, with respect to the respective determinations made in above-described steps 32, 33, and 35, in the case where it is determined that each of the conditions is not satisfied ("NO" in steps 32, 33, and 35), it is considered that the reason why the imaging information has become invalid data is not caused by blocking with an obstruction, and consequently the temporary missing flag 126 is set to "OFF" (step 38). Next performed is game processing corresponding to a case where the imaging information is invalid data. In the present embodiment, processing for the case where the controller is pointing outside of the screen (step 39) is performed. For example, processing such as that displays a message urging the player to point the controller to the screen, or that performs refilling of bullets, in the case of the above-described gun shooting game, is performed.

The above-described timer is, next caused to count up frame by frame (step 40). That is, the timer is caused to count the duration time of the situation where the imaging information is kept being invalid. For example, using a clock of the CPU 10 (or of a clock generator, which is not shown), the duration time (the number of continuous frames), during which the invalid imaging information is kept being transmitted from the controller 7, is measured. This is the end of the processing for the invalid data.

Returning to FIG. 19, after the processing of step 5 or step 6, the current acceleration data 123 is stored in the external main memory 12 as the most recent acceleration data 124 (step 7). Subsequently, the current pointing coordinates 1251 is stored in the external main memory 12 as the most recent pointing coordinates 1252 (step 8). The both data are to be used for the next processing loop.

Next, it is determined whether or not the main processing according to the present embodiment is to be completed (step 9). In the case of "YES", the processing ends, and in the case of "NO", the processing is repeated after returning to step 2. This is the end of the processing according to the present embodiment.

In the present embodiment, when predetermined processing is performed in accordance with the imaging information, the magnitude of the motion of the controller 7 is determined in the case where the imaging information includes invalid data. If the magnitude of the motion of the controller 7 is large, the target image to be picked up is considered to be outside of an imaging range, whereby processing for the case of the invalid data is performed. When the magnitude of the motion of the controller 7 is small, processing is performed by using valid information, that is, by utilizing valid imaging information used most recently or data based thereon. Accordingly, when valid imaging information cannot be obtained temporarily due to obstruction or the like, in spite of the above-described markers 8L and 8R being included in the imaging range of the controller 7, it is possible to avoid performing the processing for the case where the controller 7 is pointing outside of the screen. That is, it is possible to perform the predetermined processing based on the assumption that the controller 7 is pointing to the screen.

Note that, in the above-described embodiment, when the magnitude of the motion of the controller 7 is determined, the angular difference between the above-described most recent acceleration vector and the current acceleration vector is utilized. The determination is not limited thereto, and the scalar product of the both vectors may be used. For example, determination may be made based on whether or not the scalar product of the above-described most recent acceleration vector and the current acceleration vector is within a predetermined value range. It may be possible to set such that the motion of the controller 7 is determined to be small if the scalar product is within the predetermined value range, and the motion of the controller 7 is determined to be large if the scalar product is outside the predetermined value range. Further, the above-described scalar product can be calculated in the following manner. First, the magnitude of the above-described most recent acceleration vector and the current acceleration vector are each normalized into 1. The scalar product is then calculated as follows.

$$\vec{a} \cdot \vec{b} = \cos \theta$$

(wherein, $\vec{a}$ represents the current acceleration vector, and $\vec{b}$ represents the previous time acceleration vector.)

The magnitude of the motion of the controller 7 is determined based on whether or not the value of the scalar product is within the predetermined value rage.

Figure 23:
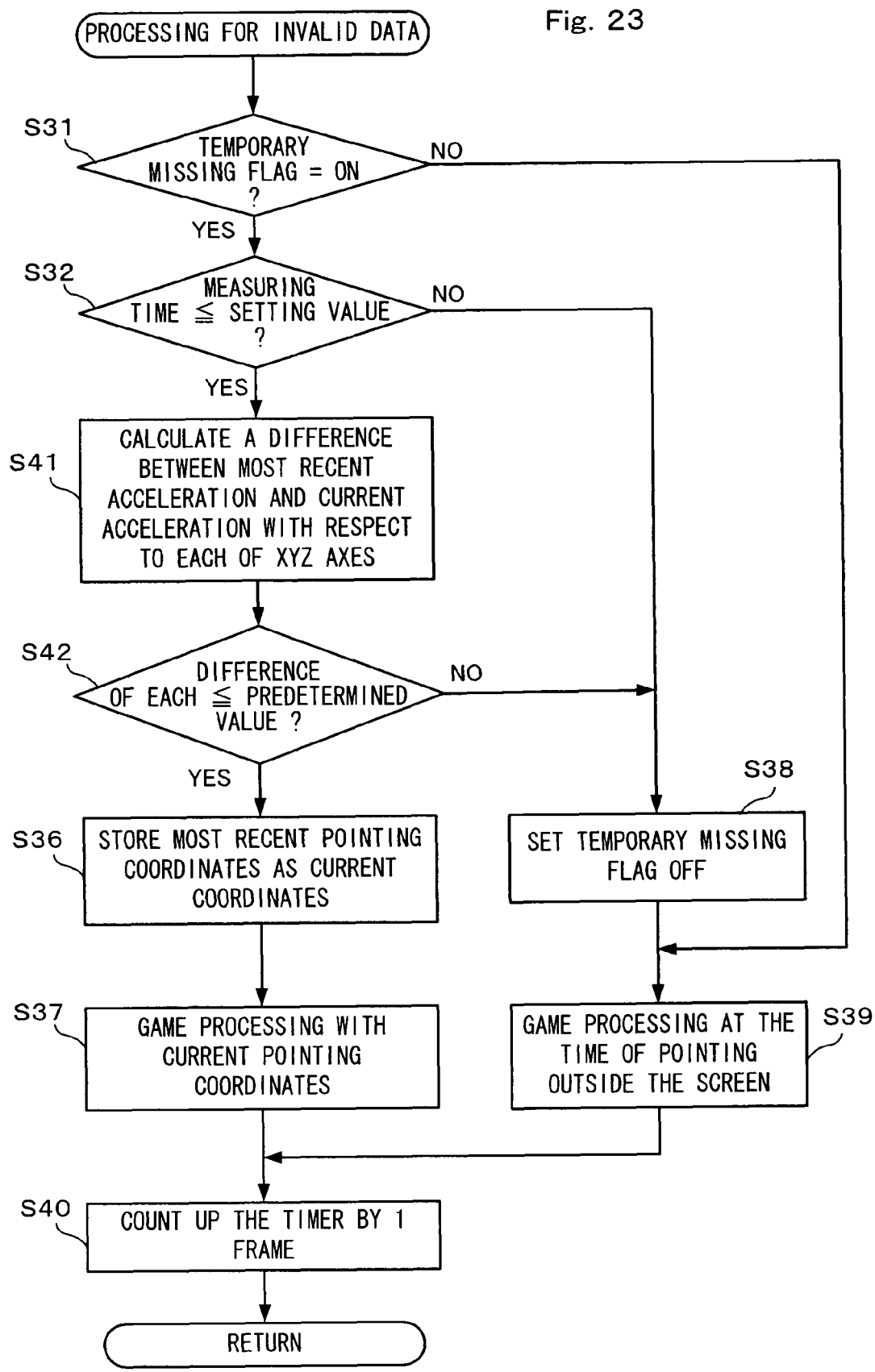
FIG. 23 is a flowchart illustrating a modified example of the processing for the invalid data as shown in step 6 of FIG. 19.

Further, the magnitude of the motion of the controller 7 may be calculated by calculating differences between the respective three axial accelerations of x, y, and z in the current acceleration data 123 and in the most recent acceleration data 124. Accordingly, whether or not the controller 7 is moved to a large extent is determined, based on the calculation result, whether or not the differences are equal to or lower than predetermined values. In this case, instead of the processing for the invalid data as shown in FIG. 22, the processing for the invalid data as shown in FIG. 23 may be performed. In FIG. 23, in the case where the determination in step 32 is "YES", the differences in acceleration between the respective three of the x, y, and z-axes in the most recent acceleration data 124 and those in the current acceleration data 123 are calculated (step 41). Whether or not the differences are equal to or lower than respective predetermined values is determined (step 42), and if the differences between all of the three axes in the most recent acceleration data 124 and those in the current acceleration data 123, respectively, are determined to be equal to or lower than the predetermined values ("YES" in step 42), it is considered that the controller 7 is not moved to a large extent, whereby the processing of above-described step 36 and the following steps are performed. On the other hand, if the differences in none of the three axes in the most recent and the current acceleration data, respectively, is equal to or lower than the predetermined values ("NO" in step 42), it is considered that the controller 7 is moved to a large extent, whereby the processing of the above-described step 38 and the following steps are performed. Accordingly, compared to the processing for the invalid data as shown in above-described FIG. 22, the processing can be simplified, whereby it is possible to improve a speed of the processing.

Figure 24:
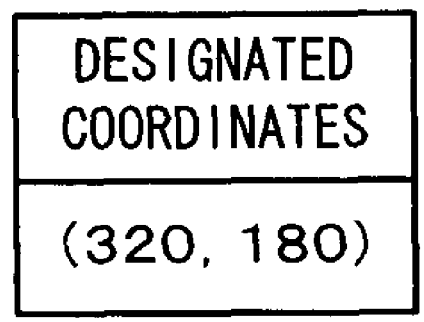
FIG. 24 is a diagram illustrating exemplary imaging information.
Figure 25:
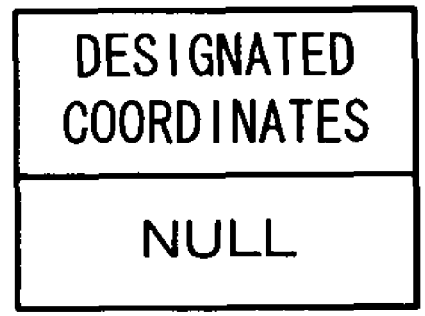
FIG. 25 is a diagram illustrating exemplary imaging information.

Further, with regard to the above-described imaging information, a case where two-point coordinates information of the markers 8L and 8R is transmitted has been described as an example in the above-described embodiment. However, without limiting to the case, it may be possible for the controller 7 to calculate the midpoint of the above-described two points so as to output coordinates thereof as imaging information. In this case, if the imaging information is valid data, as shown in FIG. 24, the coordinates of the midpoint (designated coordinates) are outputted as the imaging information. On the other hand, if the imaging information is invalid data, as shown in FIG. 25, the NULL code is outputted as the imaging information. In this case as well, processing similar to that as above described can be performed by determining whether or not the imaging information includes the NULL code or not (above-described step 4).

Further, in the above-described embodiment, as exemplary invalid data, a case where only one or none of the high brightness positions (8L', 8R' in FIG. 9) can be detected from the image to be picked up has been described. Without limiting thereto, it is possible to set such that a case is determined to be invalid data, where three or more high brightness portions are detected in the image to be picked up. For example, a case such as that where a monitor 2 is located near a window, there may be a case where the imaging information calculation section 74 collects the sunlight (or infrared radiation included in the sunlight) shining in through the window. Even if the monitor 2 is not located near the window, in the case where a glossy material is placed near the marker 8, the light such as the sunlight shining in through the window, and the infrared radiation emitted from the LED is reflected on the glossy material, and consequently the imaging information calculation section 74 may collect the reflected light. Therefore, the controller 7 also picks up the image of the light from the light source other than the markers 8L and 8R. As a result, in the case where three or more high brightness positions (corresponding to 8L' and 8R' in FIG. 9) are detected from the image to be picked up, it is impossible to calculate the above-described midpoint, and thus it is impossible to calculate the pointing coordinates. Therefore, in such case, it may be possible to cause the image processing circuit 744 of the controller 7 to set and transmit the NULL code. Even in this case, by determining, as above described, whether or not the imaging information is the NULL code (the above-described step 4), it is possible to perform processing similar to that as above described.

Further, with regard to determination whether or not the imaging information is invalid data or not, the determination is not limited to such that is based on the existence of the NULL code as above described. It may be possible to use an additional code representing the invalid data. Alternatively, without using any dedicated code representing invalidity, it may be possible to set such that a case will not be determined as invalid data, where the imaging information satisfies a predetermined condition (in the above embodiment, a case where the pointing coordinates can be calculated).

Further, in the above-described embodiment, as exemplary processing based on the imaging information, a case has been described where the pointing coordinates on the screen is calculated based on the imaging information, and given processing (such as cursor display and the like) is performed with respect to the pointing coordinates. Without limiting to the given processing performed to the pointing coordinates, as above described, it may be possible to adopt such processing that shifts, for example, in game processing such as FPS (First Person Shooting Game), a motion of a virtual camera having a first person point of view (or a point of gaze) in accordance with the orientation of the controller 7. That is, it may be possible to set such that if the controller 7 is moved to the right, the screen scrolls from left to right in accordance with variation in the coordinates represented by the above-described imaging information, i.e., variation in the orientation of the controller 7, and if the controller 7 is moved to the left, the screen scrolls from right to left in accordance with the variation in a similar manner. If the imaging information becomes invalid data since a person passes in front of the screen during the screen being scrolled to the right, and consequently the variation in the coordinates cannot be calculated, it is possible to continue the screen scroll processing using the variation calculated in the most recent processing loop.

With regard to the processing based on the imaging information, without limiting to the game processing executed by the above-described game apparatus, it is understood that the present invention is applicable to other information processing. For example, the present invention is applicable, in information processing using a personal computer, to processing such as that points a screen of a personal computer by using an input device having a camera and imaging information picked up thereby.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon an information processing program executable by a computer of a information processing apparatus which, by using an operation apparatus including an imaging device for picking up a target image to be picked up so as to obtain imaging information, and in accordance with the imaging information, executes predetermined processing corresponding to an orientation of the operation apparatus with respect to a location of the target image to be picked up, the information processing program causing the computer to execute:

successively obtaining motion information from a motion sensor outputting the motion information corresponding to a motion of the operation apparatus;

successively obtaining the imaging information from the imaging device;

determining whether the imaging information is valid information or invalid information for the predetermined processing;

calculating a motion value representing a magnitude of the motion of the operation apparatus in accordance with the motion information; and executing, when the imaging information is determined as invalid information and when the calculated motion value is within a predetermined value range, the predetermined processing in accordance with most recent imaging information among valid imaging information obtained before the imaging information determined to be invalid information is obtained.

2. The non-transitory computer readable storage medium having stored thereon the information processing program according to claim 1, wherein calculating the motion value is executed only when the imaging information is invalid information.

3. The non-transitory computer readable storage medium having stored thereon the information processing program according to claim 1, wherein:

determining whether the imaging information is valid information or invalid information includes determining whether or not the imaging information satisfies a predetermined condition, and in the case where the imaging information is determined not to satisfy the predetermined condition, the imaging information is determined to be invalid information.

4. The non-transitory computer readable storage medium having stored thereon the information processing program according to claim 1, wherein:
the predetermined processing is a process of calculating a pointing position on a screen of a given display apparatus;
in the case where the pointing position of the imaging information cannot be calculated, the imaging information is determined to be invalid information;
executing the predetermined processing calculates, when the imaging information is determined to be invalid information, and when the calculated motion value is within the predetermined value range, the pointing position in accordance with the most recent imaging information among the valid imaging information.

5. The non-transitory computer readable storage medium having stored thereon the information processing program according to claim 1, wherein:
the predetermined processing calculates, based on the imaging information, a variation in the orientation of the operation apparatus;
when the variation cannot be calculated based on the imaging information, the imaging information is determined to invalid information; and
the predetermined processing performs, when the imaging information is determined to be invalid information and when the calculated motion value is within the predetermined value range, processing by using the variation calculated most recently.

6. The non-transitory computer readable storage medium having stored thereon the information processing program according to claim 1, wherein:
the invalid information for the predetermined processing represents imaging information including a NULL code; and
it is determined whether the imaging information is valid information or invalid information in accordance with whether or not the imaging information includes the NULL code.

7. The non-transitory computer readable storage medium having stored thereon the information processing program according to claim 1, wherein:
the information processing program further causes the computer, after the imaging information is determined to be invalid information, to execute measuring a duration of time during which the imaging information successively obtained is continuously being determined as the invalid information; and
predetermined processing is performed for the case of the invalid information when the duration of time measured is equal to or larger than a predetermined value.

8. The non-transitory computer readable storage medium having stored thereon the information processing program according to claim 1, wherein:
the motion sensor is an acceleration sensor detecting acceleration exerted on the operation apparatus; and
the motion information includes acceleration data outputted from the acceleration sensor in accordance with the motion of the operation apparatus.

9. The non-transitory computer readable storage medium having stored thereon the information processing program according to claim 8, wherein:
calculating a motion value includes:
calculating a first acceleration vector in accordance with the acceleration data;
calculating a second acceleration vector in accordance with acceleration data obtained immediately prior to the acceleration data; and
calculating an angular difference between the first acceleration vector and the second acceleration vector,
the predetermined processing is executed in accordance with the most recent imaging information among the valid imaging information obtained before the imaging information determined as the invalid information is obtained, when the calculated angular difference is within a predetermined range.

10. The non-transitory computer readable storage medium having stored thereon the information processing program according to claim 8, wherein:
calculating a motion value includes:
calculating a first acceleration vector in accordance with the acceleration data;
calculating a second acceleration vector in accordance with acceleration data obtained immediately prior to the acceleration data; and
calculating a scalar product of the first acceleration vector and the second acceleration vector,
the predetermined processing is executed in accordance with the most recent imaging information among the valid imaging information obtained before the imaging information determined as the invalid data is obtained, when the scalar product calculated is within a predetermined range.

11. The non-transitory computer readable storage medium having stored thereon the information processing program according to claim 8, wherein:
the acceleration sensor detects acceleration along at least two coordinate axes perpendicular to one another,
the information processing program further causes the computer to execute calculating, when the imaging information is determined to be invalid information, a difference in the acceleration along each of said at least two coordinate axes between acceleration data detected at the time when the invalid information is obtained and most recent acceleration data among acceleration data which is detected before the invalid information is obtained; and
only when the difference in the acceleration along at each of said at least two coordinate axes calculated is equal to or lower than a predetermined value, the predetermined processing is executed in accordance with the most recent imaging information among the valid imaging information obtained before the imaging information determined as to be invalid information is obtained.

12. An information processing apparatus for executing, by using an operation apparatus including an imaging device for picking up a target image to be picked up so as to obtain imaging information, and in accordance with the imaging information, predetermined processing corresponding to an orientation of the operation apparatus with respect to a location of the target image to be picked up, the information processing apparatus comprising:
a motion sensor for outputting motion information corresponding to a motion of the operation apparatus;
a processor;
a memory coupled to said processor, said memory storing instructions that, when executed by said processor, control said processor to:
successively obtain the motion information, from the motion sensor, so as to be stored in the memory;

successively obtain the imaging information, from the imaging device, so as to be stored in the memory;

read the imaging information from the memory and determine whether the imaging information is valid information or invalid information for the predetermined processing;

read the motion information from the memory and calculate a motion value representing a magnitude of the motion of the operation apparatus in accordance with the motion information;

read, when the imaging information is determined to be invalid information and when the calculated motion value is within a predetermined value range, most recent imaging information, among valid imaging information obtained before the imaging information determined as the invalid information is obtained, so as to be used for executing the predetermined processing.

13. The information processing apparatus according to claim 12, wherein calculating the motion value is executed only when the imaging information is invalid information.

14. The information processing apparatus according to claim 12, wherein:
the processor is further controlled to determine whether or not the imaging information satisfies a predetermined condition; and
when the predetermined condition is not satisfied, the imaging information is determined as invalid information.

15. The information processing apparatus according to claim 12, wherein:
the predetermined processing is a process of calculating a pointing position on a screen of a given display apparatus;
the processor is controlled to determine, in the case where the pointing position of the imaging information cannot be calculated, the imaging information as invalid information;
the processor is controlled to calculate, when the imaging information is determined as to be invalid information, and when the calculated motion value calculated is within the predetermined value range, the pointing position in accordance with the most recent imaging information among the valid imaging information.

16. The information processing apparatus according to claim 12, wherein:
the predetermined processing is calculating, based on the imaging information, a variation in the orientation of the operation apparatus;
the processor is controlled to determine, in the case where the variation cannot be calculated based on the imaging information, the imaging information as invalid information; and
the processor is controlled to perform, when the imaging information is determined to be invalid information and the calculated motion value is within the predetermined value range, processing by using the variation calculated most recently.

17. The information processing apparatus according to claim 12, wherein:
the invalid information for the predetermined processing represents imaging information including a NULL code; and
the processor is controlled to determine whether the imaging information is valid information or invalid information in accordance with whether or not the imaging information includes the NULL code.

18. The information processing apparatus according to claim 12, wherein:
the processor is further configured to measure, after the imaging information is determined to be invalid information, a duration of time during which the imaging information successively obtained is continuously being determined as invalid information; and
the processor executes predetermined processing for the case of invalid information, when the duration time measured by the timer means is equal to or larger than a predetermined value.

19. The information processing apparatus according to claim 12, wherein:
the motion sensor is an acceleration sensor detecting acceleration exerted on the operation apparatus; and
the motion information includes acceleration data outputted from the acceleration sensor in accordance with the motion of the operation apparatus.

20. The information processing apparatus according to claim 19, wherein:
the processor is further configured to:
calculate a first acceleration vector in accordance with the acceleration data;
calculate a second acceleration vector in accordance with acceleration data obtained immediately prior to the acceleration data; and
calculate an angular difference between the first acceleration vector and the second acceleration vector,
the processor executes the predetermined processing in accordance with the most recent imaging information among the valid imaging information obtained before the imaging information determined as the invalid information is obtained, when the calculated angular difference is within a predetermined range.

21. The information processing apparatus according to claim 19, wherein:
the processor is further configured to:
calculate a first acceleration vector in accordance with the acceleration data;
calculate a second acceleration vector in accordance with acceleration data obtained immediately prior to the acceleration data; and
calculate a scalar product of the first acceleration vector and the second acceleration vector,
the processor executes the predetermined processing in accordance with the most recent imaging information among the valid imaging information obtained before the imaging information determined as the invalid data is obtained, when the calculated scalar product is within a predetermined range.

22. The information processing apparatus according to claim 19, wherein:
the acceleration sensor detects acceleration along at least two coordinate axes perpendicular to one another;
the processor is further controlled to calculate, when the imaging information is determined to be invalid information, a difference in the acceleration along each of said at least two coordinate axes between acceleration data detected at the time when the invalid information is obtained and most recent acceleration data among acceleration detected before the invalid information is obtained; and
the processor executes, only when the calculated difference in the acceleration along each of said at least two coordinate axes is equal to or lower than a predetermined value, the predetermined processing in accordance with most recent imaging information among the valid imaging information obtained before the imaging information determined to be invalid information is obtained.

23. A method for using an operation apparatus including an imaging device for picking up a target image to be picked up so as to obtain imaging information, and in accordance with the imaging information, executing predetermined processing corresponding to an orientation of the operation apparatus with respect to a location of the target image to be picked up, the method comprising:

successively obtaining motion information from a motion sensor outputting the motion information corresponding to a motion of the operation apparatus;

successively obtaining the imaging information from the imaging device;

determining whether the imaging information is valid information or invalid information for the predetermined processing;

calculating a motion value representing a magnitude of the motion of the operation apparatus in accordance with the motion information; and executing, when the imaging information is determined as invalid information and when the calculated motion value is within a predetermined value range, the predetermined processing in accordance with most recent imaging information among valid imaging information obtained before the imaging information determined to be invalid information is obtained.

* * * * *